US011120267B1

(12) United States Patent
Pellegrino et al.

(10) Patent No.: US 11,120,267 B1
(45) Date of Patent: Sep. 14, 2021

(54) CAMERA SOLUTION FOR IDENTIFICATION OF ITEMS IN A CONFINED AREA

(71) Applicant: Datalogic USA Inc., Eugene, OR (US)

(72) Inventors: Luigi Pellegrino, Casalecchio di Reno (IT); Pietro Todescato, Eugene, OR (US); Luca Rocchini, Turate (IT); Filippo Malaguti, Bologna (IT); Fabio Peruzzi, Waxhaw, NC (US); Mark Cohen, Portland, OR (US); Bradley Weber, Eden Prairie, MN (US); Ryan Adkins, Waxhaw, NC (US); Darrell Owen, Quakertown, PA (US)

(73) Assignee: Datalogic USA, Inc., Eugene, OR (US)

( * ) Notice: Subject to any disclaimer, the term of this patent is extended or adjusted under 35 U.S.C. 154(b) by 83 days.

(21) Appl. No.: 16/402,760

(22) Filed: May 3, 2019

Related U.S. Application Data

(60) Provisional application No. 62/666,526, filed on May 3, 2018.

(51) Int. Cl.
*G06K 9/00* (2006.01)
*G06Q 10/08* (2012.01)
*G06T 7/73* (2017.01)
*G06T 7/20* (2017.01)
*G06F 16/58* (2019.01)

(52) U.S. Cl.
CPC ......... *G06K 9/00684* (2013.01); *G06F 16/58* (2019.01); *G06Q 10/087* (2013.01); *G06T 7/20* (2013.01); *G06T 7/73* (2017.01)

(58) Field of Classification Search
CPC combination set(s) only.
See application file for complete search history.

(56) References Cited

U.S. PATENT DOCUMENTS

| | | | |
|---|---|---|---|
| 5,734,568 A * | 3/1998 | Borgendale | B07C 3/20 |
| | | | 382/102 |
| 6,328,215 B1 | 12/2001 | Dickson et al. | |
| 6,895,330 B2 | 5/2005 | Cato et al. | |
| 7,040,541 B2 | 5/2006 | Swartz et al. | |
| 7,155,405 B2 | 12/2006 | Petrovich | |

(Continued)

FOREIGN PATENT DOCUMENTS

| | | |
|---|---|---|
| CN | 106022692 A | 10/2016 |
| CN | 206075336 U | 4/2017 |
| JP | 4739744 B2 | 8/2011 |

*Primary Examiner* — Anand P Bhatnagar
(74) *Attorney, Agent, or Firm* — Foley & Lardner LLP

(57) ABSTRACT

A system and method for managing packages may include determining an identifier on a package. A determination as to whether the package is to be positioned on a pallet based on the identifier may be made. In response to determining that the package is not to be positioned on the pallet, a first feedback signal (e.g., red light) indicative to the operator that the package is not to be placed on the pallet may be generated. In response to determining that the package is to be positioned on the pallet, a second feedback signal (e.g., green light) that is indicative to the operator that the package is to be on the pallet may be generated or no signal may be generated. Additionally, if an identifier cannot be read from the package, then a third feedback signal (e.g., yellow light) may be generated and illuminated on the package or elsewhere.

20 Claims, 14 Drawing Sheets

(56) References Cited

U.S. PATENT DOCUMENTS

| | | | |
|---|---|---|---|
| 8,459,632 B2* | 6/2013 | DeWitt | G06K 9/00442 |
| | | | 270/52.01 |
| 9,349,112 B2 | 5/2016 | Gazdzinski et al. | |
| 9,488,986 B1 | 11/2016 | Solanki | |
| 9,892,353 B1 | 2/2018 | Lui et al. | |
| 10,643,038 B1* | 5/2020 | McCalib, Jr. | H04N 7/181 |
| 10,853,757 B1* | 12/2020 | Hill | G06T 7/70 |
| 2006/0025886 A1* | 2/2006 | Avant | B07C 3/18 |
| | | | 700/224 |
| 2010/0073481 A1 | 3/2010 | Kaltenbach et al. | |
| 2011/0178633 A1* | 7/2011 | Marrese | G06Q 10/087 |
| | | | 700/229 |
| 2014/0083058 A1 | 3/2014 | Issing et al. | |
| 2015/0130592 A1 | 5/2015 | Lakshminarayanan et al. | |
| 2015/0178675 A1 | 6/2015 | Perez | |
| 2016/0063429 A1 | 3/2016 | Varley et al. | |
| 2018/0068255 A1* | 3/2018 | Hance | G06Q 10/087 |
| 2018/0089616 A1* | 3/2018 | Jacobus | G05D 1/0274 |
| 2018/0144430 A1* | 5/2018 | Millhouse | G06Q 50/28 |
| 2018/0247404 A1* | 8/2018 | Goyal | G06K 9/6202 |
| 2018/0322362 A1* | 11/2018 | Souder | G06K 9/6215 |

* cited by examiner

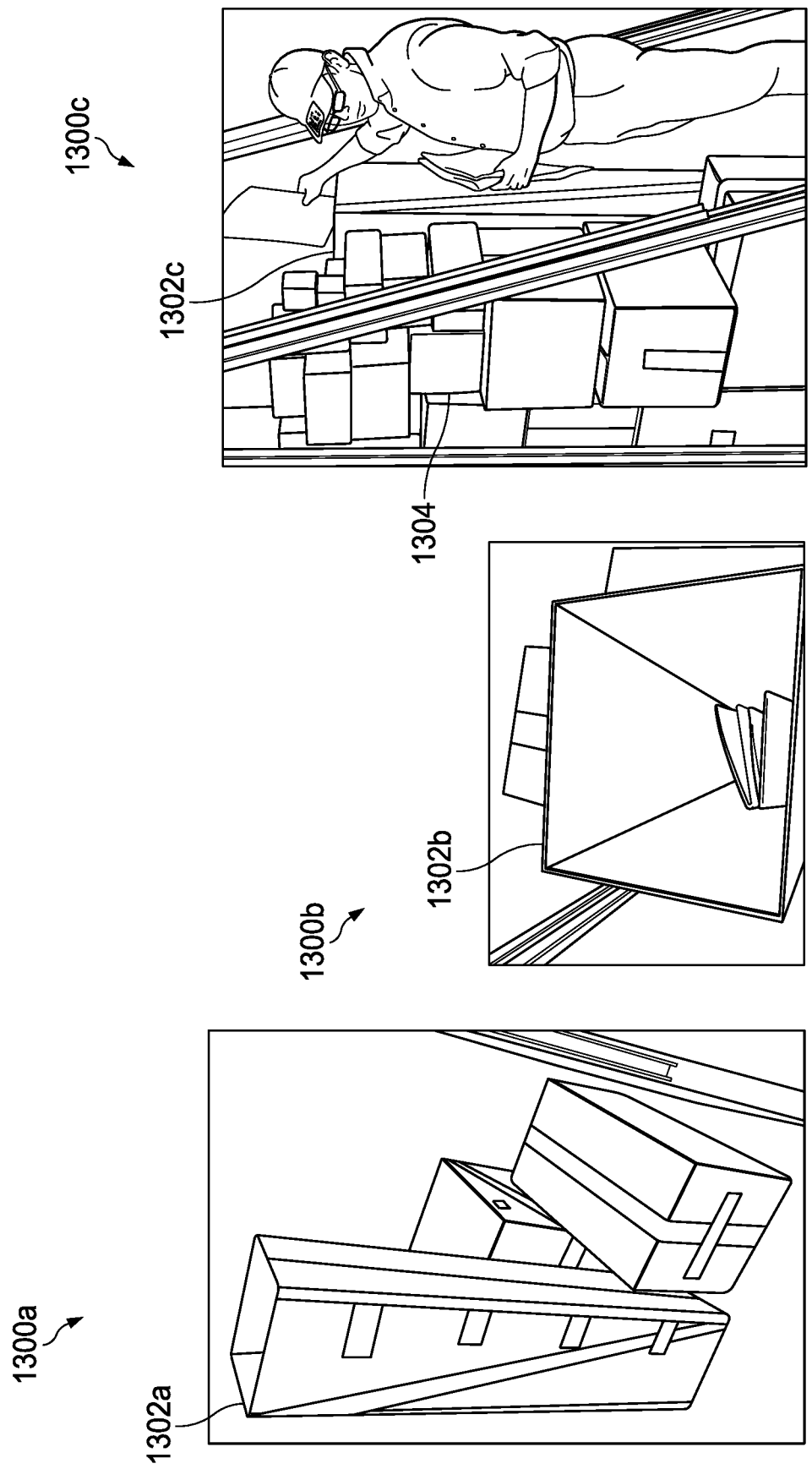

CAMERA SOLUTION FOR IDENTIFICATION OF ITEMS IN A CONFINED AREA

CROSS REFERENCE TO RELATED APPLICATION

This application claims the benefit of U.S. Provisional Application No. 62/666,526, filed May 3, 2018, and entitled "Camera Solution for Identification of Items in Confined Area," the disclosure of which is hereby incorporated in its entirety by this reference.

TECHNICAL FIELD

The present disclosure relates to the real-time identification of items in a confined area, or more particularly, to a scanning of packages at pallets and validation of the packages by an overhead imaging system.

BACKGROUND

Online shopping has exploded over the past 20 years. Mass consumer goods sales sites of online retailers originally distributed a limited selection of products. However, as those sites have grown to become mass merchants, the ability to fulfill orders has become a significant issue for the online retailers. To compete with traditional brick-and-mortar retailers, online retailers have to provide same day delivery or even delivery within a few hours. Such time constraints places a significant burden on the online retailers for accessing the ordered products and shipping those products to the correct destination within the needed timeframe without making mistakes in that process. As it appears that online shopping will continue to grow for the foreseeable future and delivery times continue to be reduced, logistics of handling and shipping the products will become a larger challenge. To handle such expected product distribution increases, online retailers are developing warehousing and delivery processes that include the use of bulk containers, such as pallets or other shipping structures (e.g., roll-containers, racks, and so on), to move the products from warehouse(s) towards final destinations.

Currently, products that are to fulfill online orders are selected at a warehouse, placed on a conveyer system, and manually carried from the conveyer system to a container (e.g., pallet, roll-container, or other bulk shipping structure, as understood in the art). For the purposes of this disclosure, the term "pallet" refers to any structure for shipping products in bulk.

The process of hand-carrying the products from the conveyer system to a container that is destined for a destination for the product can be a challenge over time for workers or operators. Human factors often play a part of errors that are made when operators or workers handle the physical transfer from the conveyer system to a correct container destined for a particular geography. Such human factors may include, but are not limited to, long shifts during which the workers are challenged to move quickly in a confined space. Over time, accuracy of physically moving the products to the correct container tends to drop, even for the best operators.

To support the logistics of moving products from the conveyer to a shipping structure, one conventional technique to improve accuracy includes the use of a handheld barcode scanner by workers to scan machine-readable indicia (e.g., barcode) at a pallet and a machine-readable indicia (e.g., barcode) on a package. The scanner includes or is in communication with a processing unit (e.g., computer) that determines whether the package is to be placed at that pallet. In an alternative embodiment, a barcode scanner is placed near the pallet, and the worker scans a machine-readable indicia that enables the processing unit to determine whether the package is supposed to be placed on the pallet or not. In either case, the worker has to align the machine-readable indicia with the barcode scanner so that the processing unit can determine whether the package is to be placed on the pallet. Feedback, such as audible and/or visual indicators, is provided to the worker based on the determination by the processing unit.

BRIEF SUMMARY

An improvement in logistics when physically moving products from conveyer (or other) systems to pallets may include the use of an overhead imaging system that is capable of reading an identifier, such as a represented by a machine-readable indicia (e.g., barcodes, QR codes, or other codes) that include or are indicative of a destination identifier, product identifier, or otherwise. The overhead imaging system may include one or more 2D cameras that may capture images of packages that are being moved and/or placed on the pallets. The cameras or processing unit(s) in communication with the cameras may process the images, read or determine the identifier, and provide guidance and/or other sensory feedback signal (e.g., visual, audible, and/or tactile) to an operator who is or has moved a package to a pallet. The sensory feedback provides verification for the operators to help ensure that the package that are moved to a pallet is moved to the correct pallet (i.e., a pallet that is being shipped to a destination on the way to a final destination of the package). In an embodiment, the overhead imaging system may track operators moving through the confined area between the conveyer system and the pallet(s) with a package or at or near the pallet(s), read a destination of the package, and provide feedback in the event that the operator is or has moved the package to an incorrect pallet. In an embodiment, a three-dimensional (3D) camera may be placed over a pallet, determine when height of region on the pallet has increased, read a machine-readable indicia on a package placed on that region, and determine whether the package is on the correct pallet.

One embodiment of a process for managing logistics of packages may include determining an identifier (e.g., a one-dimensional code, two-dimensional code, a watermark, a graphical pattern, a set of characters/numbers, a shape of) on the package as captured by at least one camera. Alternatively, the identifier may be the shape and/or another feature of the package recognized by the camera or by a vision processor in communication with the camera such that the recognized feature of the package allows for a univocal or unique identification of the package. A determination as to whether the package is to be positioned on a pallet based on the identifier may be made. In response to determining that the package is not to be positioned on the pallet (before and/or after being positioned on the pallet), a first feedback signal indicative to the operator that the package is not to be placed on the pallet may be generated. The first feedback signal may be an illumination signal of a particular color (e.g., red) that is imaged onto the package or elsewhere. Other feedback signals, such as audible or tactile, may additionally and/or alternatively be generated. Alternatively, in response to determining that the package is to be positioned on the pallet, a second feedback signal that is indicative to the operator that the package is to be on the pallet may be generated or no second feedback signal may be generated. The second feedback signal may be a different color, such as a green illumination signal. Other feedback signals, such as audible or tactile signals, may also be generated, to let the operator know that the package is being placed on the correct pallet. Additionally, if an identifier cannot be read from the package, then a third feedback signal, such as a yellow illumination signal, may be generated. The third feedback signal may be any other type of sensory signal, such as an audible or tactile signal, may be generated for the operator.

BRIEF DESCRIPTION OF THE DRAWINGS

Illustrative embodiments of the present disclosure are described in detail below with reference to the attached drawing figures, which are incorporated by reference herein and wherein:

FIGS. 13A-13C are images of illustrative environments in which "chimneys" are used on pallets for collecting padded envelopes and optionally other packages;

DETAILED DESCRIPTION

Figure 1:
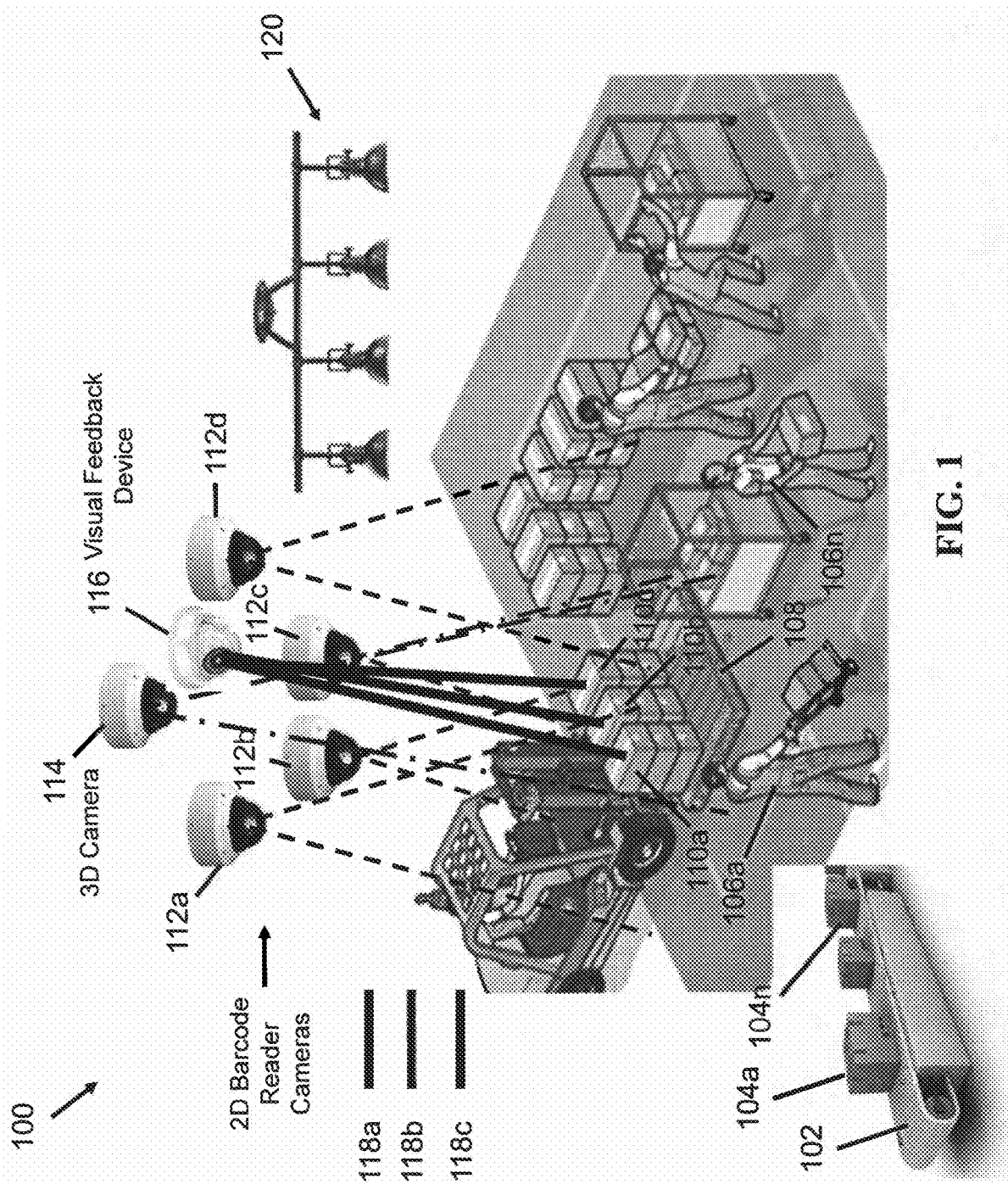
FIG. 1 is an illustration of an illustrative package processing environment in which packages (e.g., boxes, items, parcels, etc.) may be moved on a conveyer system and workers or operators are to move those packages to particular pallets during a fine sorting process of the packages, and an overhead code reading system may be used to improve accuracy of placing the packages on a correct pallet.

With regard to FIG. 1, an illustration of an illustrative package processing environment 100, including a conveyer system 102 that moves packages (e.g., boxes, items, parcels, etc.) 104*a*-104*n* (collectively 104) for workers or operators 106*a*-106*n* (collectively 106) to physically move those packages 104 to a pallet 108 of a number of pallets (other pallets not shown) during a fine sorting process of the packages 104 is shown. Illustrative overhead code readers or cameras 112*a*-112*d* (collectively 112) may be used to improve accuracy of placing the packages 104 on a correct pallet 108, for example, for further distribution of the packages. It should be understood that the cameras 112 shown are for illustration purposes only, and that any configuration of camera may be utilized (e.g., non-domed cameras). Moreover, any number of cameras may be utilized to perform the same or equivalent function. The overhead cameras 112 may be part of a reading system in which barcode reading cameras 112 may be two-dimensional (2D) cameras capable of reading an identifier, such as a machine-readable indicia, such as 1D or 2D codes, due to having sufficient resolution and optionally machine-readable indicia (e.g., barcode) reading functionality.

In an embodiment, a three-dimensional (3D) camera 114 capable of performing 3D measurements may be disposed over a pallet 108 to enable a tracking system to determine that a change in height of packages on the pallet 108 has occurred so that an identifier on the package 110*a*, for example, may be read. Thereafter, a determination may be made that the package 110*a* is on the correct pallet 108 for further distribution. In an embodiment, the cameras 112 may be maintained in an OFF state, and in response to the 3D camera determining that a package 110*a* has been added to the pallet 108, a system may trigger the barcode reader cameras 112 to turn to an ON state and/or read an identifier on the package 110*a*, as further described herein.

Figure 5:
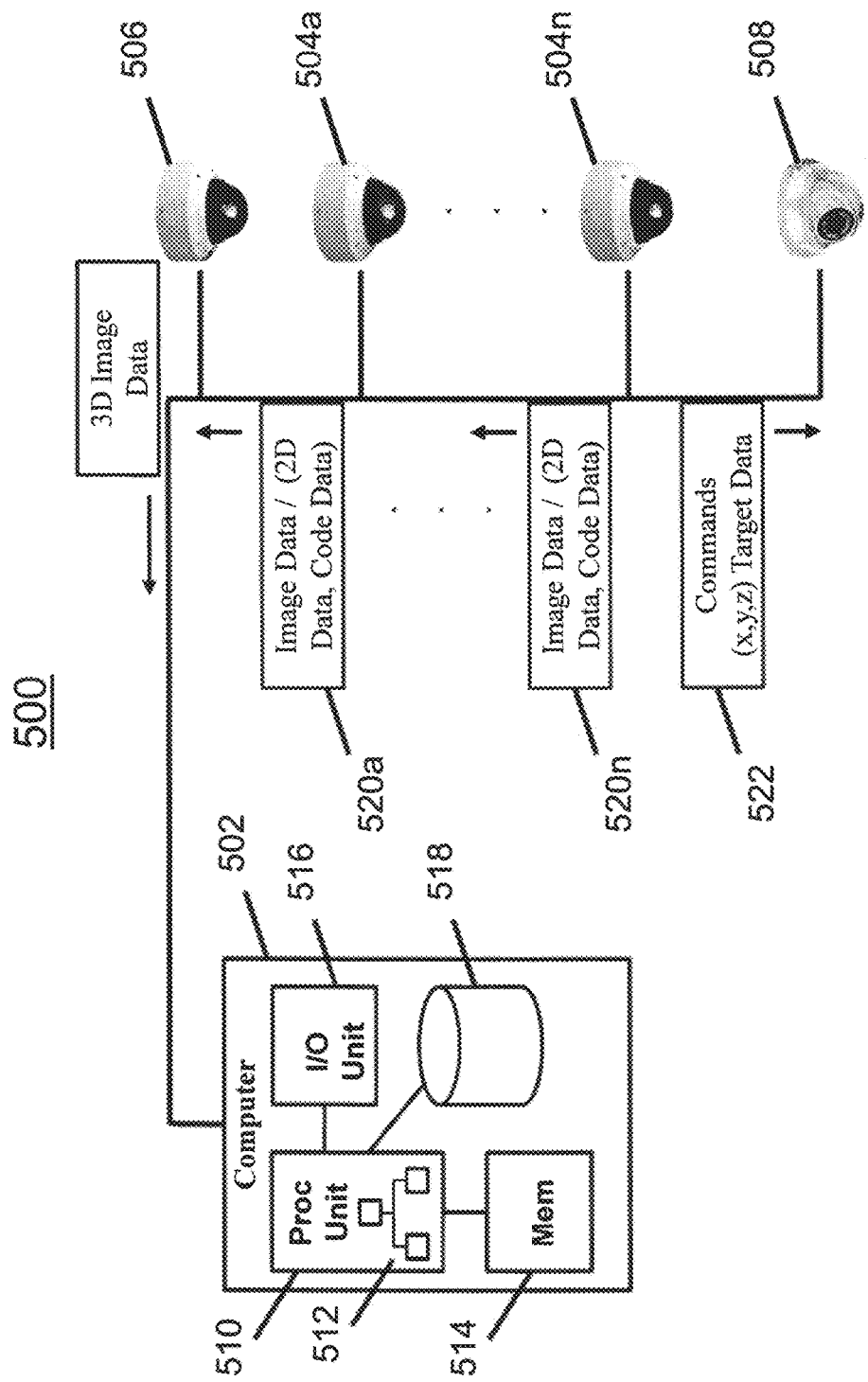
FIG. 5 is an illustration of an illustrative network environment in which a computer may be in communication with one or more sensors, such as 2D cameras and optionally a 3D camera, for monitoring for correct or incorrect placement of packages on pallets.

The system 100 may be configured with a controller (see FIG. 5, for example). The controller may be a separate device or one of the cameras 112. In the second scenario, if the controller stops working (e.g., due to an hardware failure), another camera may automatically replace the non-functioning controller, thereby providing redundancy. The cameras 112 may be configured to acquire and decode an image every time a trigger from the controller is received (sent via TCP connection, for example). The cameras 112 may decode the identifier or ID codes (e.g., machine-readable indicia) in the image, and send to the controller the information of each decoded identifier. The information may be encoded data and the coordinates, in pixels, of the corners of code bounding box or other delimiter. Those information, which may include both data encoded into the identifier and data related to the position of the identifier inside the image that are the coordinates of the four corners of the identifier, may be sent to the controller via TCP in JSON format, for example. The controller may be configured to trigger each of the connected cameras 112, wait for the decoding results, and elaborate the data.

A visual feedback device 116 may be configured to output real-time illumination feedback signals 118*a*-118*c* (collectively 118) having different colors, such as red, yellow, and green. The visual feedback device 116 may include a steering mirror (not shown) or other electromechanical device that may be configured to cause the illumination feedback signals 118 to be illuminated onto the packages 110 that were placed on the pallets at the time of placement. In an embodiment, if the placement of the package 110b is correct, then a green (good) illumination feedback signal 118b may be generated; if the placement of the package 110c is incorrect, then a red (bad) illumination feedback signal 118c may be imaged onto the package 110c; if the placement of the package 110a is indeterminable due to the machine-readable indicia not facing the cameras 112, being damaged, or otherwise not being readable, then a yellow (indeterminable or inconclusive) illumination feedback signals 118 may be imaged onto the package 110a. The illumination feedback signal 118 may be generated, for example, by a multi-color LED or laser source, and the illumination feedback signals 118 may be in the form of a shape (e.g., circle), and may be projected onto a package or elsewhere visible to the worker 106a. In an embodiment, the illumination feedbacks signal 118 may be also a sequence of alphanumeric characters (e.g., made by using an actuated mirror to move any of the illumination feedback signals 118). For example, a projected number may be counts of right/wrong/unknown packages moved from the conveyor system 102 to pallets associated to a worker 106a, thereby providing visual feedback for the worker 106a. The counts may indicate that the worker needs a break. The feedback signals 118 may also be indicative of a number of packages that the worker 106a carried the last time he or she entered the pallet area. For instance, if the worker 106a sees just a green "2" projected, while he has carried three packages, the worker 106a may be alerted that the third package has not been seen by the overhead camera system. This is helpful when a steering mirror is not used and it is not possible to projects spots onto each single package; it is possible to project just a colored alphanumeric feedback close to the worker 106a. Additional implantation details regarding visual feedback of result indications may include those described in U.S. Pat. No. 6,997,385, issued Feb. 14, 2006, and entitled "Apparatus and Method for Acquiring and Reading Optical Codes with Result Indication," the disclosure of which is hereby incorporated in its entirety by this reference. In the event that the worker 106a be presented with a yellow (or other color) feedback indicator to indicate that the system is unable to read an identifier, then the worker may simply face identifier on the package toward the cameras 112, replace a damaged identifier, or otherwise have a supervisor assist with the situation.

Alternative real-time feedback techniques may be utilized in response to determining that the package placed on the pallet 108 is correct, incorrect, or inconclusive. For example, an electronic display positioned proximate the pallet 108 may display a color. Alternatively, a wearable device, such as a watch, eyewear (e.g., virtual glasses), and/or headset with a visual projection device, may be configured to display a color and/or alphanumeric sequence to indicate correctness of the placement of the packages 104 on pallets. Other real-time feedback mechanisms, such as audible (e.g., beeps, voice commands, etc.) and/or tactile (e.g., vibration), may provide for real-time feedback to the workers 106 using wearable or other devices. Because the overhead sensor system may be continuously operating, the workers 106 may simply be able to move the packages 104 without having to stop and perform barcode scanning, as has to be performed using conventional processes, thereby improving efficiency of the logistics.

Overhead cameras provide for unobstructively monitoring hand-carried packages from the conveyor system 102 to the pallets during a sorting process. In an embodiment, the sensor solution may be mounted above each pallet and continuously scan the designated pallet area for new pallets and new packages 104 being placed upon the pallet 108, for example. In an embodiment, the cameras 112, 114, and visual feedback device 116 may be fixedly positioned on or suspended from a ceiling or support structure (e.g., ceiling beam). Alternatively, the cameras 112, 114, and visual feedback device 116 may be positioned on a temporary, portable, and/or dynamically movable structure that is moved above pallets that are actively being populated with packages 104, thereby potentially reducing fixture, system, and operational costs.

As shown, the cameras 112a and 112b are positioned at different heights. The reason for having the cameras at different heights is so that the fields-of-view (FOVs) of the cameras 112a and 112b overlap and depths-of-field (DOF) of the cameras 112a and 112b can be different, thereby providing for different resolution and coverage for monitoring the workers 106 independent of the packages 110, packages 110 being placed on the pallets 108, the pallets 108 themselves, workers 106 carrying packages 110, and any other people or objects that the 2D cameras can be used to monitor in the confined work area within the fields-of-view and depths-of-field of the cameras 112a and 112b. It should be understood that more than two cameras may have overlapping fields-of-view (e.g., all four cameras 112 may have overlapping FoVs). In the illustrative embodiment of FIGS. 2A and 2B, all four cameras represented as cameras 202a-202d have overlapping FoVs at a certain height range. Moreover, reading volume is increased by using cameras with different depths-of-field. In an embodiment, the reading volume may be larger than a fully loaded pallet 108 (e.g., 40×48×77 inches). The cameras 112c and 112d may be used for the same purposes as the cameras 112a and 112b, and may provide for redundancy.

As will be described in more detail, in the illustrative embodiment shown in FIGS. 2A and 2B, at a minimum reading distance (i.e., the maximum readable code height), the fields-of-view of 2D cameras or code readers 202a and 202b are not enough by themselves to cover the whole pallet area. As a consequence, code readers 202c and 202d are utilized to ensure full coverage of the pallet area. At longer reading distances (i.e., lower code heights), a single code reader is able to cover the whole pallet area, so the reading redundancy is much higher in the middle height range, where the reading volumes of the four cameras 202 are maximally overlapped. For example, the cameras 112 may be used to monitor multiple workers 106 and multiple packages 110 at the same time. The cameras 112 may have the same or different resolution, such as 2 megapixel cameras.

Although four cameras 112 are shown in FIG. 1, it should be understood that as many cameras as desired may be utilized or needed depending on a configuration of a working area in which packages 104 are being delivered to be placed on pallets 108. Furthermore, although the cameras 112 are shown to be limited to be over the pallets 108, it should be understood that additional cameras may be disposed over other pathways between the conveyor system 102 and pallets 108, and may be utilized to track the workers 106 and packages 104 being carried thereby to be placed on the pallets 108. Tracking of the worker 106 may be at any location between the package origin to the destination, and may provide guidance to the worker 106 as to any available path (e.g., shortest path) to the destination for package loading on a pallet 108. Such worker tracking may be used to monitor efficiency, provide for corrective guidance should the worker be taking a package to an incorrect pallet, or otherwise. In some embodiments, the system may receive an image of the package being carried by the operator, and in response to determining that the operator is along a path moving toward an incorrect pallet with the package, cause a first signal to be generated indicative to the worker 106 that the package is not to be placed on the pallet. This indication may be provided to the worker 106 at any stage along the path toward the pallet (e.g., prior to the package arriving at the pallet) that the system detects an incorrect path is being taken.

In an embodiment, each of the workers 106 may have an operator identifier that may be read by the cameras 112. The identifiers may be in any format, and be machine readable. The identifiers may be in visible or non-visible inks (if the cameras are capable of reading non-visible inks, for example). RFID tags may also be possible as identifiers such that RFID sensors (not shown) are able to track the workers 106. In one embodiment, the cameras 112 may be compatible with power-over-Ethernet (PoE) 802.3at Type 2, and be compatible with a OC to +60 C operating temperature range. The cameras 112 may further be sealed to IP65 and IP67 ratings.

In an alternative embodiment, rather than using more cameras, a single camera with high resolution (e.g., 12 megapixels) with a vision processor may be utilized. One downside to using fewer cameras is that it is possible for packages to block direct line-of-sight to other packages.

In addition to the real-time feedback being helpful to significantly reduce placement errors, data associated with the real-time feedback may additionally be helpful in monitoring processes, efficiency, alertness, and other statistically useful information for the workers, management, engineers, and/or others. Moreover, alerts may be established to create an alert-type notification in the event that regular or certain types of packages (e.g., mature, hazardous, etc.) are delivered to the wrong location, are dropped, are poorly placed on the pallet, are placed too close to other packages that could be potentially problematic (e.g., chemicals place too close to one another), and so on. The alerts may cause the visual feedback device 116 to generate a different illumination color (e.g., blue), generate a flashing illumination (e.g., flashing red), generate a writing (e.g., write a warning or hazard symbol and/or alphanumeric characters), generate an audio alert signal, and/or generate an alert tactile signal (e.g., different vibration). As another example, if too many packages are being placed together (e.g., more than 100 packages on a single pallet) or the packages are being placed too high on the pallet (e.g., greater than 6 or 8 feet), then a warning or alert signal may be generated.

In an embodiment, one or more of the cameras 112 may have an ambient light sensor that is capable of sensing ambient light in the workspace in which the pallets are located. Based on the amount of ambient light, if the light is too low, then additional lighting may be produced by an external illuminator, such as overhead or directed lighting 120 so that the cameras are capable of reading (e.g., using image processing, such as optical character recognition or barcode reading algorithms, or any other machine vision processing) identifiers (e.g., text, barcodes, QR codes, markings, shapes, etc.) on the packages 104 as the packages 104 are being moved through the work area to the pallets 108. As an alternative, a light sensor output can be used to tune/optimize camera software parameters, such as image sensor exposure time or gain to enable the cameras 112 to operate in lower ambient lighting conditions. In an embodiment, ambient light threshold may be set at 350 lux (lumens per square meter). Depending on the configuration of the cameras 112, no additional illumination is needed when the ambient light is above the ambient light thresholds, and additional illumination may be applied when the ambient light is below the ambient light threshold. In an embodiment, the ambient light may be supplemented with an illuminator that is acceptable to workers (e.g., light that is not continuously increased and decreased, but rather is imperceptible or mildly perceptible). In an embodiment, different color light may be utilized that does not negatively impact a worker, such as a soft blue light.

Figure 2A:
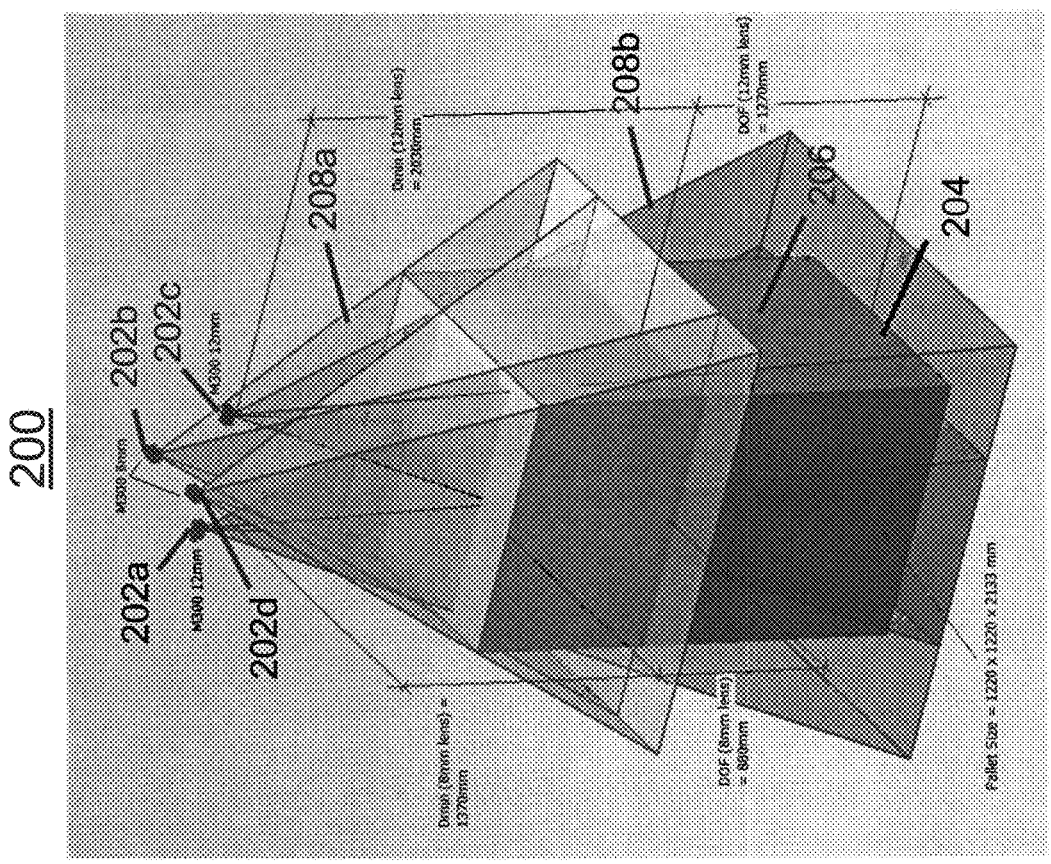
FIGS. 2A and 2B are illustrations of respective perspective and overhead views of illustrative cameras showing fields-of-view and depths-of-field in association with potential pallet volumes.
Figure 2B:
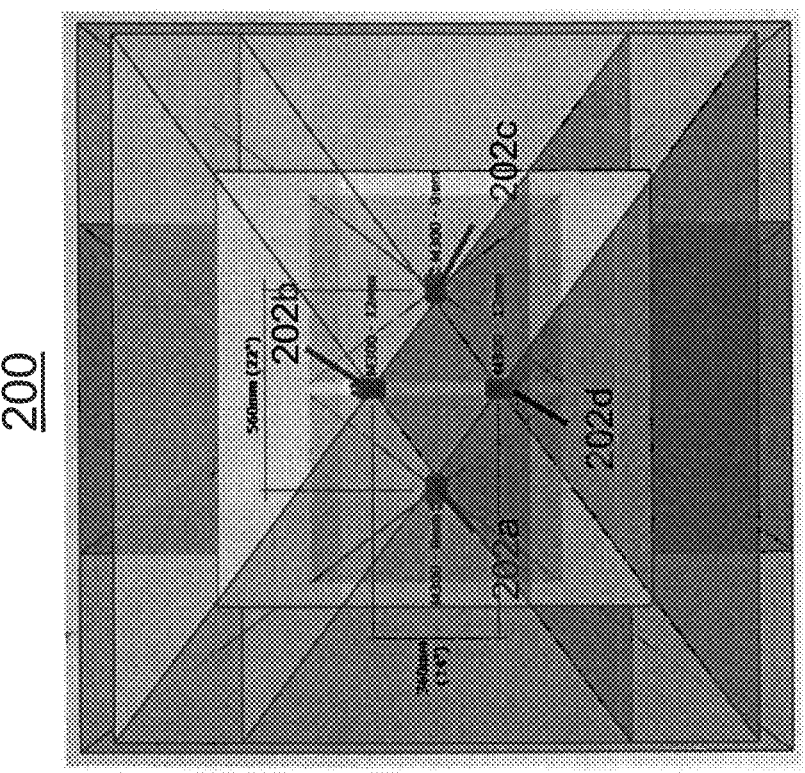

With regard to FIGS. 2A and 2B, illustrations of respective perspective and overhead views of an environment 200 with illustrative 2D cameras 202a-202d (collectively 202) showing fields-of-view and depths-of-field in association with potential pallet volumes are shown. In this environment, the cameras 202 are positioned above a pallet 204 with a maximum pallet load 206 having a volume of 1220×1220× 2133 mm that is shown to be within image volumes 208a and 208b defined by at least two of the cameras with respective different depths-of-field. For clarity, the image volume 208a is intended as the combination of the pyramids (i.e., fields-of-view) formed under 2D cameras 202b and 202d. The actual reading volume of cameras 202b and 202d is a part of the pyramids because their minimum reading distance, referred to a DataMatrix code with 110 mils resolution, is 1370 mm. As a consequence, cameras 202b and 202d may be read from 1370 mm to 2250 mm (DoF=2250−1370=880 mm). Similarly, the image volume 208b is intended as a combination of the two pyramids that are the fields-of-views of cameras 202a and 202c. The actual reading volume of cameras 202a and 202c is a part of the pyramids because their minimum reading distance, referred to a DataMatrix code with 110 mils resolution, is 2030 mm. As a consequence, cameras 202a and 202c can read from 2030 mm to 3300 mm (DoF=3300−2030=1270 mm).

Figure 3:
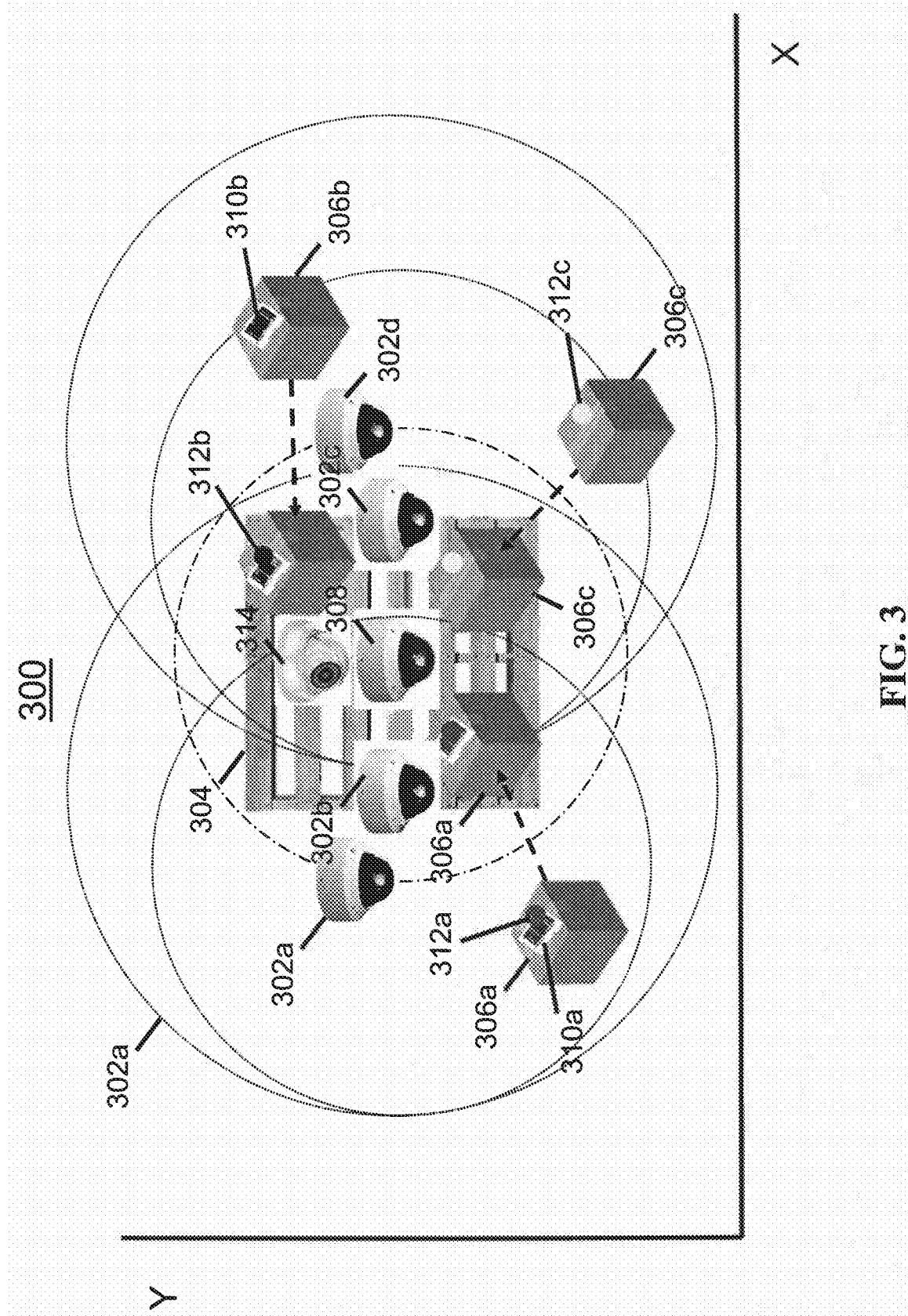
FIG. 3 is an illustration of a top view of another illustrative package processing environment in which packages are monitored by sensors, such as cameras, and visual feedback is provided to users based on verification of correct placement of the packages on a pallet.

With regard to FIG. 3, an illustration of a top view of another illustrative package processing or logistics environment 300 in which packages are monitored by sensors 302a-302d (collectively 302), such as 2D cameras, and sensory feedback, in this case visual feedback, is provided to users based on verification of correct placement of the packages on a pallet is shown. The sensors 302 may be configured as pairs, where each sensor of a pair has a different field-of-view and depth-of-field as the other sensor, and have overlapping fields-of-view so as to produce overlapping imaging volume that collectively encapsulate at least a portion of the pallet 304 and any packages 306a, 306b, 306c (collectively 306) that are placed thereon. In an embodiment, the sensors 302 may be used to determine x,y coordinates for the packages 306 that are placed on the pallet 304.

A 3D camera 308 is shown to be positioned over the pallet 304, and images captured by the 3D camera 308 may be used to monitor changing levels of packages placed on the pallet 304. A processing unit (not shown) may determine from the 3D camera 308 that the levels of packages on the pallet 304 changes in a region, and cause the sensors 302 to capture images of the package that is placed on the pallet 304. As shown, packages 306a, 306b, and 306c are moved onto the pallet 304. In each case, images of the packages 306a, 306b, and 306c on the pallet are captured along with machine-readable indicia 310, if viewable, on each respective package. It should be understood that any other type of identifier other than a machine-readable indicia, may be included on the packages 306 and the same or similar functionality may be used in reading or otherwise identifying a code or other information that may be used in determining which pallet that the packages are to be placed. The processing unit may determine that the respective package associated with the machine-readable indicia are correctly or incorrectly on the pallet 304. If correct, then a first illumination feedback signal 312a, such as green, may be caused to be illuminated onto the package 306a by an electronic device 314, such as a laser pointer. If incorrect, then a second illumination feedback signal 312b, such as red, may be caused to be illuminated onto the package 306b by the electronic device 314. If indeterminate, then a third illumination feedback signal 312c, such as yellow, may be caused to be illuminated onto the package by the electronic device 314.

Figure 4:
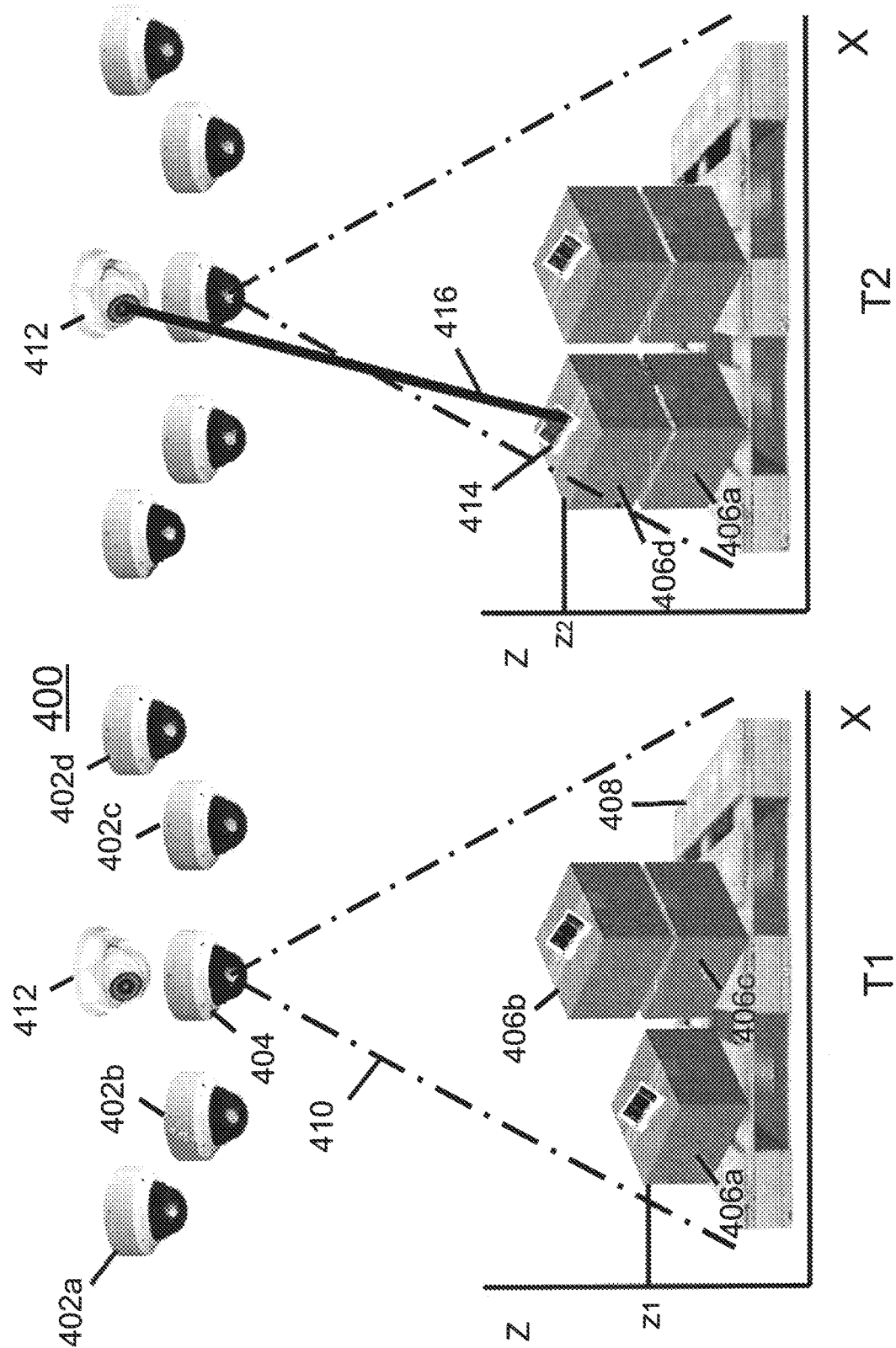
FIGS. 4A and 4B are illustrations of a side view of another illustrative package processing environment in which packages are monitored by sensors, such as cameras, and visual feedback is provided to users based on verification of correct placement of the packages on a pallet.

With regard to FIGS. 4A and 4B, illustrations of a side view of another illustrative package processing environment 400a and 400b at times T1 and T2 in which packages are monitored by sensors, such as 2D cameras 402a-402d and a 3D camera 404, and visual feedback is provided to users based on verification of correct placement of packages 406a-406c on a pallet 408 are shown. The 3D camera 404 may have a field-of-view 410 and depth-of-field that covers a pallet 408. In this embodiment, the visual feedback may be produced by an electronic device 412, such as a laser pointing device, configured to produce illumination signals. As shown at time T1, there are three packages 406a-406c. At time T1, a fourth package 406d is placed on top of package 406a, so that the z-axis level of the packages in the region above package 406a changes from z1 to z2. In response, the overhead camera system captures and processes an image of the package 406d along with a machine-readable indicia 414 on the package 406d. An identifier represented by the indicia 414 may be determined, and a determination may thereafter be made as to whether the package is to be on the pallet 408. If so, then the electronic device 412 may generate an illumination feedback signal 416, such as a green illumination feedback signal. If a determination is made based on the identifier that the package 406d is not meant to be on the pallet 408, then the illumination feedback signal 416 may be set to a red feedback signal. If no indicia is identified or the indicia 414 is damaged and cannot be read, then another color, such as yellow, of the illumination feedback signal 416 may be illuminated onto the package 406d. As previously described, alternative real-time feedback, such as an audible feedback (e.g., beep, voice command, etc.) or tactile (e.g., vibration) from a wearable or electronic device may be given to an operator other than an illumination signal being incident onto the package 406d. In an embodiment, a local wireless communications channel may be established to communicate with an electronic device, such as a smart watch, smart phone, wristband, or other electronic device, may be utilized for real-time feedback to the operator.

With regard to FIG. 5, an illustration of an illustrative network environment 500 in which a computer 502 may be in communication with one or more sensors, such as 2D cameras 504a-504n (collectively 504) and optionally a 3D camera 506, for monitoring for correct or incorrect placement of packages on pallets is shown. A human sensory feedback signal, such as an illumination signal, may be produced by an electronic device, such as a laser pointer 508. According to an embodiment, the electronic device 508 includes a steerable mirror to steer direction of the laser or LED (e.g., point the laser or LED onto a package placed onto a pallet). The computer 502 may include a processing unit 510 inclusive of one or more processors (e.g., general processors, digital signal processors, image processors, etc.), software 512 executed by the processing unit 510, memory 514 configured to store data, such as image data (e.g., still images, data, video, etc.), input/output (I/O) unit 516 for communicating data over a communications network, and storage unit 518 configured to store the software 512 and data, such as data captured by the cameras 504 and 506, destination data of packages and pallets that may be used to determine which pallets the packages are to be placed, and so on. It should be understood that a wide range of hardware systems may be utilized to capture and process the images collected by the cameras 504 such that substantially real-time feedback performance capabilities of determining where packages are to be located from amongst over 1,000 potential destinations may be supported. The software may include software modules, as provided in FIG. 6, which may be executed by the processing unit 510.

In operation, the 2D cameras 504 may capture images (e.g., still and/or video), and the computer 502 may perform image processing to monitor for packages, machine-readable indicia, or a combination thereof. The 2D cameras 504 may capture image data 520a-520n (collectively 520), including 2D data (i.e., x,y coordinates of a package) and code data (e.g., image of a machine readable indicia, identifier represented by the indicia). Other data, such as operator location, package movement data, and/or otherwise, may be captured by the 2D cameras 504 and be communicated to the computer 502. The 3D camera 506 may capture 3D image data 522, and communicate the 3D image data 522 to the computer 502 for processing thereby. The computer 502, in processing the 3D and/or 2D image data, may determine whether the packages are being positioned at the correct pallets by inspecting a table or database stored by the memory 514 or storage unit 518, and communicate commands 522, such as x,y,z target data and color command, to the electronic device 508 to cause the electronic device to direct an image signal in a commanded color to an x,y,z coordinate. It should be understood that alternative commands by the computer 502 to other electronic devices, as previously described, may be performed to provide real-time feedback to operators to help avoid misplacement of packages on pallets.

Figure 6:
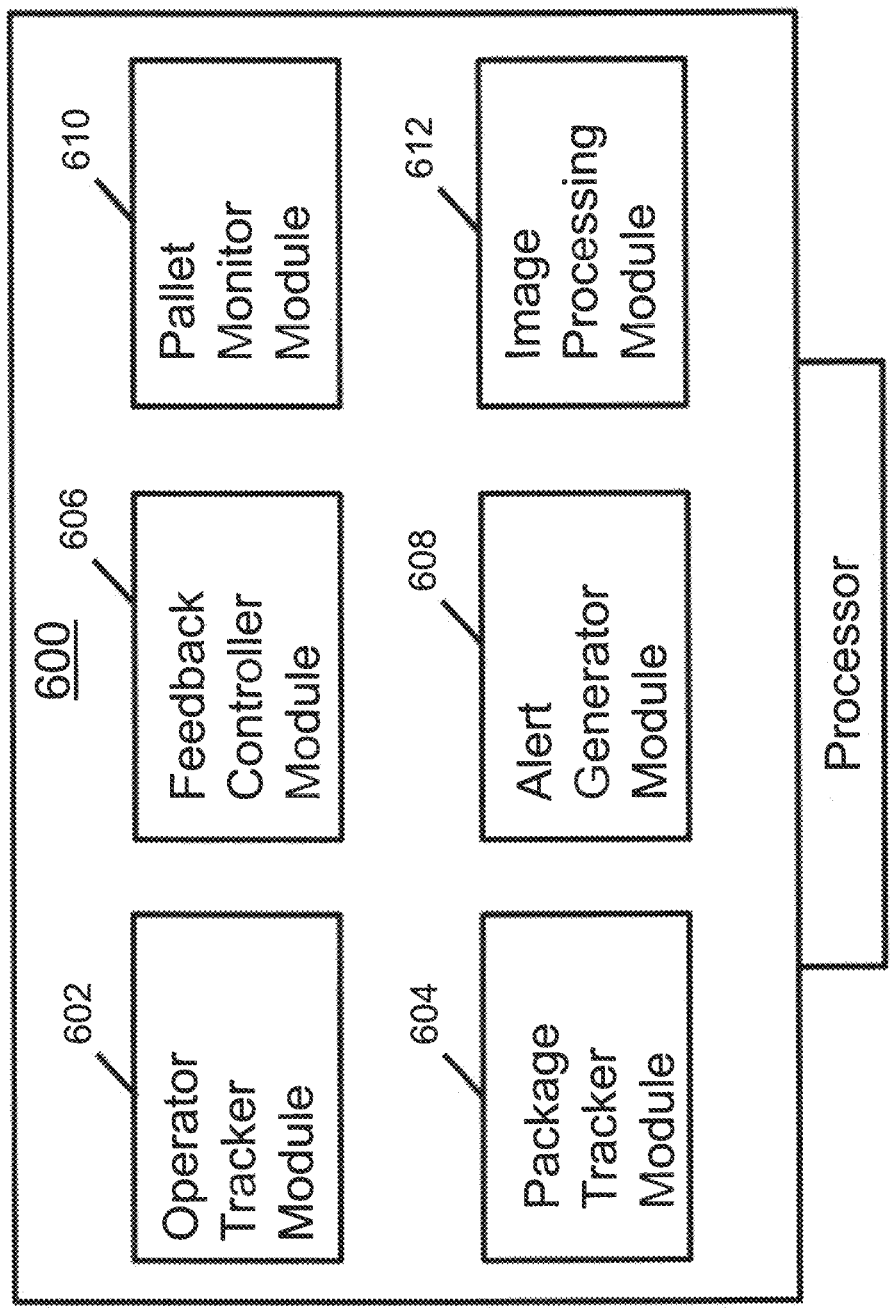
FIG. 6 is an illustrative set of software modules configured to perform functionality of the sensor system and a package logistics process in a confined area.

With regard to FIG. 6, an illustration of an illustrative set of modules 600 that may be executed by a processing unit, such as the processing unit 510 of FIG. 5, is shown. The modules 600 may include an operator tracker module 602 that may be configured to perform image processing and track operators or workers within a field-of-view of cameras. The operators may be tracked in general or specifically tracked if operator IDs are able to be identified. The operators may be tracked in two dimensions.

A package tracker module 604 may be configured to perform image processing to determine locations of packages and/or machine-readable indicia. In one embodiment, the packages may be identified based on size, shape, color, markings, being carried by an operator, or otherwise. The package tracker module 604 may be configured to track placement of the packages on pallets and/or track the packages as the package approach a pallet or are anywhere within view of a camera or other sensor. The package tracker module 604 may track direction of the package as it approaches a pallet, and a determination may be made to determine whether the package is to be placed on the pallet based on an identifier associated with the pallet and identifier associated with the package. Additionally, the package tracker module 604 may also track packages that are exiting the pallet area, for instance, whenever the worker is notified that the last carried package is not expected at that pallet and the worker corrects the error. The package tracker module 604 may determine whether a package is being placed or has been placed on a correct or incorrect pallet. If the package tracker module 604 determines that a machine-readable indicia on a package being carried or placed on a pallet cannot be read, then the pallet monitor module 604 may make an inconclusive determination for use in providing feedback to the operator.

A feedback controller module 606 may be configured to receive data from the package tracker module that is indicative of whether a package has been or is being placed on a correct or incorrect pallet, and communicate a command signal to an electronic device that causes a real-time feedback signal to be generated that notifies the operator that the package is being placed on the right or wrong pallet. The real-time feedback signal may be an optical, audible, and/or tactile signal, as previously described. Similarly, if the package tracker module 604 makes an inconclusive determination as the machine-readable indicia on the package cannot be read, the real-time feedback signal may be different from the correct or incorrect placements of the package, as previously described.

An alert generator module 608 may be configured to generate an alert signal that may be different from other feedback signals. The alert generator module 608 may cause an alert signal to be generated in response to a problem occurring, such as a package placed on an incorrect pallet to remain on the pallet for longer than a certain time period, such as 10 seconds. The alert generator module may further be configured to generate an alert if a determination that the pallet is overloaded. A wide range of situations that cause alerts to be generated may be utilized.

A pallet monitor module 610 may be configured to monitor x,y coordinates of a pallet. In an embodiment, the pallet monitor module 610 may be configured to monitor or track a specific pallet or a pallet that has been assigned to be sent to a particular destination. In an embodiment, the pallets may have machine-readable indicia displayed or otherwise associated therewith (e.g., RFID tags attached to the pallets). The pallet monitor module 610 may use the machine-readable indicia for tracking purposes. Packages thereafter that are scheduled to be sent to that location may be tracked to ensure the package are placed on that pallet and packages that are schedule to be sent to other locations may be tracked to ensure that those packages are not placed on that pallet.

At the end of loading the pallet, the pallet monitor module 610 may be configured to provide a list of loaded packages. In an embodiment, any residual wrong ("red") packages that are to be removed before pallet shipping may be highlighted (e.g., printed or displayed in red); any residual unidentified ("yellow") packages to be rechecked before pallet shipping may be highlighted (e.g., printed or displayed in yellow). To facilitate the removals/checks, plant supervisors may review images and video recorded while workers were generating errors without correction or timely correction. The pallet monitor module 610 may also provide the list of missing packages in comparison with the list of packages expected to be loaded upon that pallet. It should be understood that a variety of verification and correction processes may be utilized.

An image processing module 612 may be configured to process images captured from 2D and/or 3D cameras. The image processing may use any image processing algorithms, as understood in the art, for identifying and/or tracking packages, machine-readable indicia on the packages, operators, pallets, and/or otherwise. In an embodiment, the imaging processing module 612 may be distributed and executed at least in part in each 2D and/or 3D camera. That is, each camera may process images captured by the camera itself). Alternatively, the image processing module may be implemented in a computer in communication with the cameras.

Figure 7:
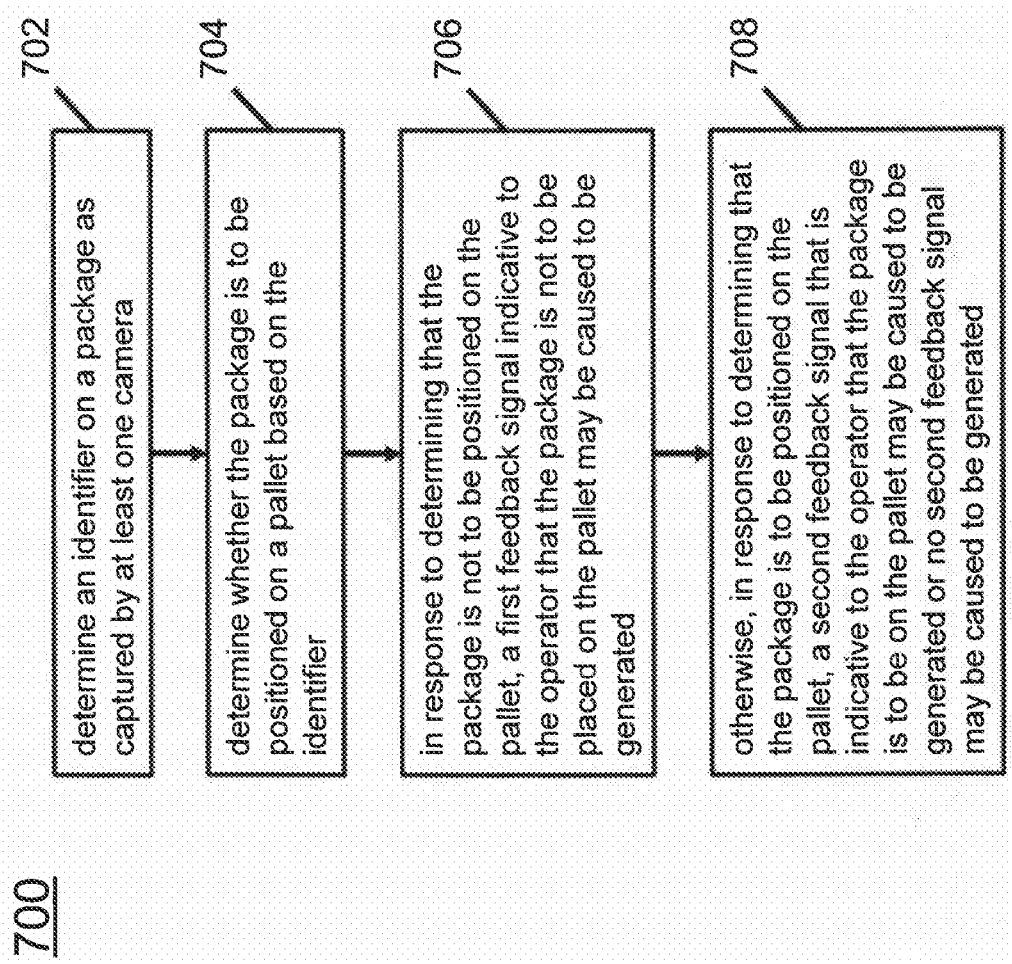
FIG. 7 is a flow diagram of an illustrative process for managing a package logistics process.

With regard to FIG. 7, a flow diagram of an illustrative process 700 for managing a package logistics process is shown. The process 700 may start at step 702, where a determination of an identifier on a package as captured by at least one camera may be performed. In being on the package, the identifier may be the shape of the package itself. At step 704, a determination may be made as to whether the package is to be positioned on a pallet based on the identifier of the package. The determination may include performing a look-up in a table or database to determine a destination (e.g., geopolitical destination or zip code) with a destination of a pallet. At step 706, in response to determining that the package is not to be positioned on the pallet (before and/or after positioned on the pallet), a first feedback signal indicative to the operator that the package is not to be placed on the pallet may be caused to be generated. The first feedback signal may be an illumination signal of a particular color (e.g., red) that is imaged onto the package or elsewhere. Other feedback signals, such as audible or tactile, may additionally and/or alternatively be generated.

At step 708, in response to determining that the package is to be positioned on the pallet, a second feedback signal that is indicative to the operator that the package is to be on the pallet may be caused to be generated or no second feedback signal is generated. The second signal may be a different color, such as green. Other signals, such as audible or tactile signals, may also be generated, to let the operator know that the package is being placed on the correct pallet.

Figure 8:
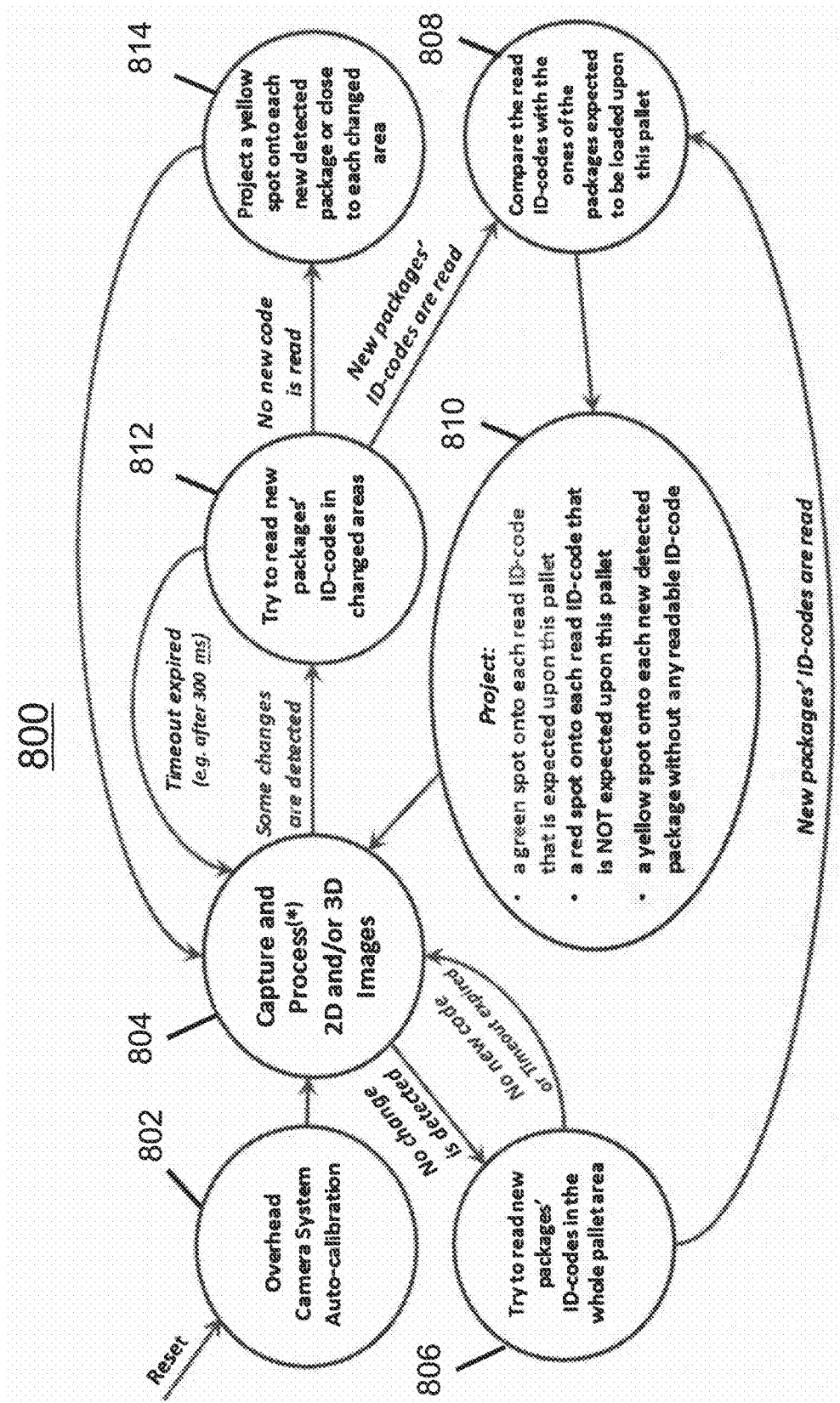
FIG. 8 is an illustrative process for managing a package logistics process without having identifiers of operators.

With regard to FIG. 8, an illustrative process 800 for managing a package logistics process without having identifiers of operators is shown. In this process, 2D/3D image processing may be used to detect the addition of new packages upon the pallet as a result of not having identifiers of operators. That is, 2D and/or 3D cameras may be used to detect the addition of new packages, and to trigger/address the code readers in response to that detection. In such an embodiment, worker identifiers are not used.

A combination of different machine vision algorithms may be used for this purpose. The image processing is time-limited, where a preassigned timeout depends on application specifications. The process 800 is very simplified in comparison with the level of processing that may be utilized. For example, the process 800 provides for main state transitions, as if all needed images are captured in a single moment. In reality, however, some feedback to workers may be based on comparison/average of results obtained capturing and processing several consecutive images.

Figures 10, 11:
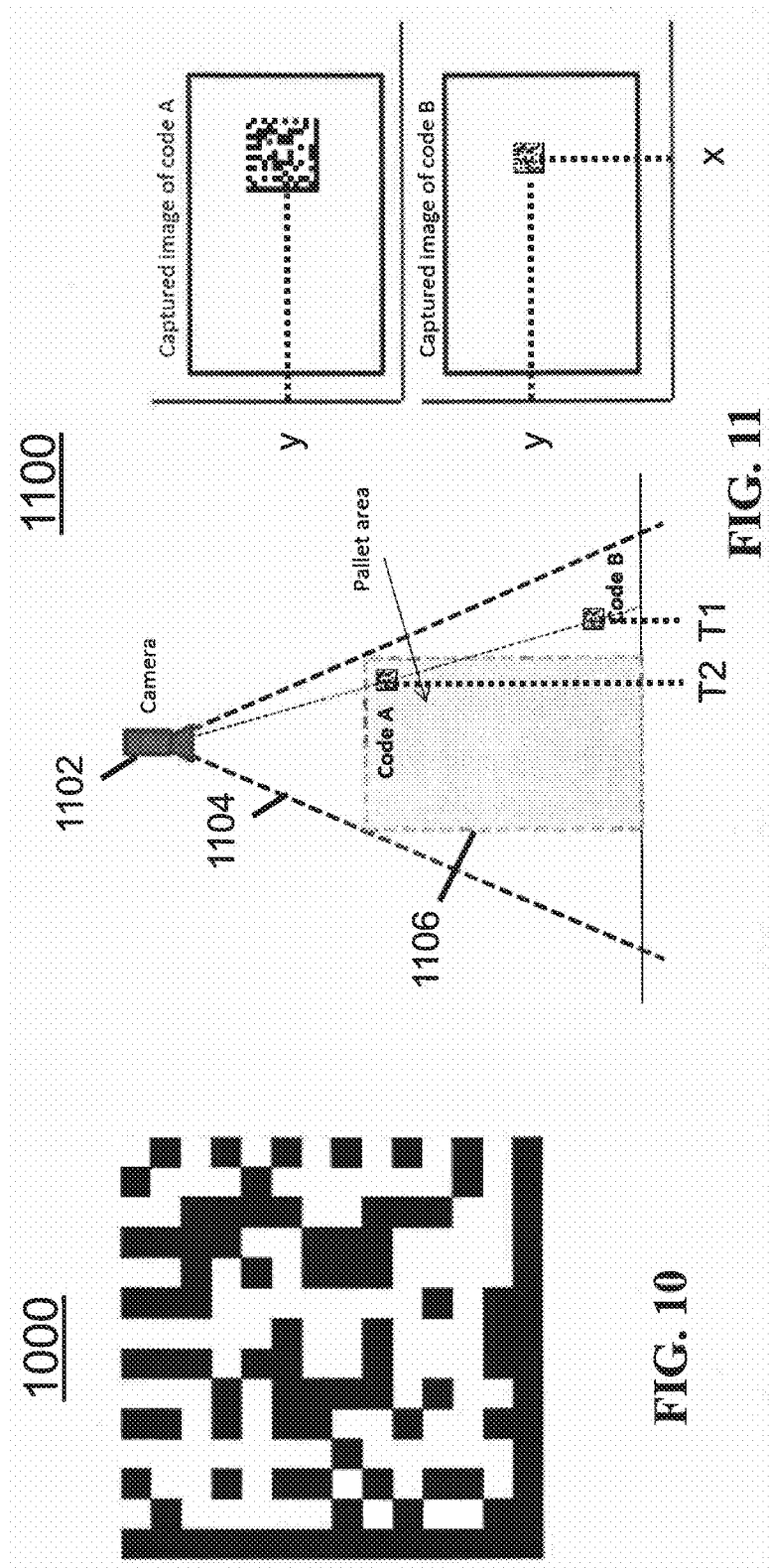
FIG. 10 is an illustrative calibration code.
FIG. 11 is an illustrative environment showing an example where, at two different times in the camera field-of-view, there are two codes (A and B) placed at two different heights.

At step 802, in response to a turn on or reset, the overhead camera system may be reset and auto-calibrated. In order to know the position of the codes in the 3D world, the controller has to know the position of the cameras relative to a World Reference System (WRS) and the real size of the decoded codes, which is known a priori. The positions of the cameras may be computed using an auto-calibration algorithm that determines roto-translation of the image plane and optical axis of each camera relative to a special code placed in a known position. In an embodiment, the special code is placed on the floor in the center of the pallet area, and the system may encodes information about the x and y position of its center with respect to the WRS. Each time the calibration code is decoded, the controller may estimate positions of the cameras. FIG. 10 is an example of a calibration code 1000. In this case, the system may be configured to know that the calibration code is 14×14 modules, and that the code size is exactly 100×100 millimeters.

Thereafter, at step 804, 2D and 3D images may be captured and processed. The processing of the 2D and 3D images may or may not detect changes (e.g., new probable packages) on the pallet. In an embodiment, new packages brought into the whole pallet area may be scanned for identifiers or ID codes. Scanning the whole pallet area is an attempt to read new identifiers of packages to help ensure that new packages are read and that may not have been detected by the 2D and 3D cameras. That is, to avoid a situation where the 2D and 3D cameras fail to detect the addition of a new package, a second check may be performed using software that reads identifiers. If a new identifier is read, then the process 800 may proceed to step 808, where the identifier may be made to verify whether the package with the identifier is supposed to be at a pallet where delivered. If correct, then a correct feedback signal (e.g., green illumination feedback signal) may be generated and displayed on the package, for example, at step 810. Otherwise, if a verification returns an incorrect placement, then an incorrect feedback signal (e.g., red illumination feedback signal) may be displayed on the package, for example, at step 810. If at step 804 changes are detected, then at step 812, additional attempts to read the codes may be performed in changed areas (e.g., changed areas on a pallet). If no new code or identifier on the package in the changed area is read, then an inconclusive feedback signal may be generated at step 814. Otherwise, if a new code is read, then at step 808, a verification as to whether the package is supposed to be on the pallet may be made. If so, then a correct feedback signal (e.g., green illumination feedback signal) may be generated and displayed on the package, for example, at step 810. Otherwise, if a verification returns an incorrect placement, then an incorrect feedback signal (e.g., red illumination feedback signal) may be displayed on the package, for example, at step 810.

Figure 9:
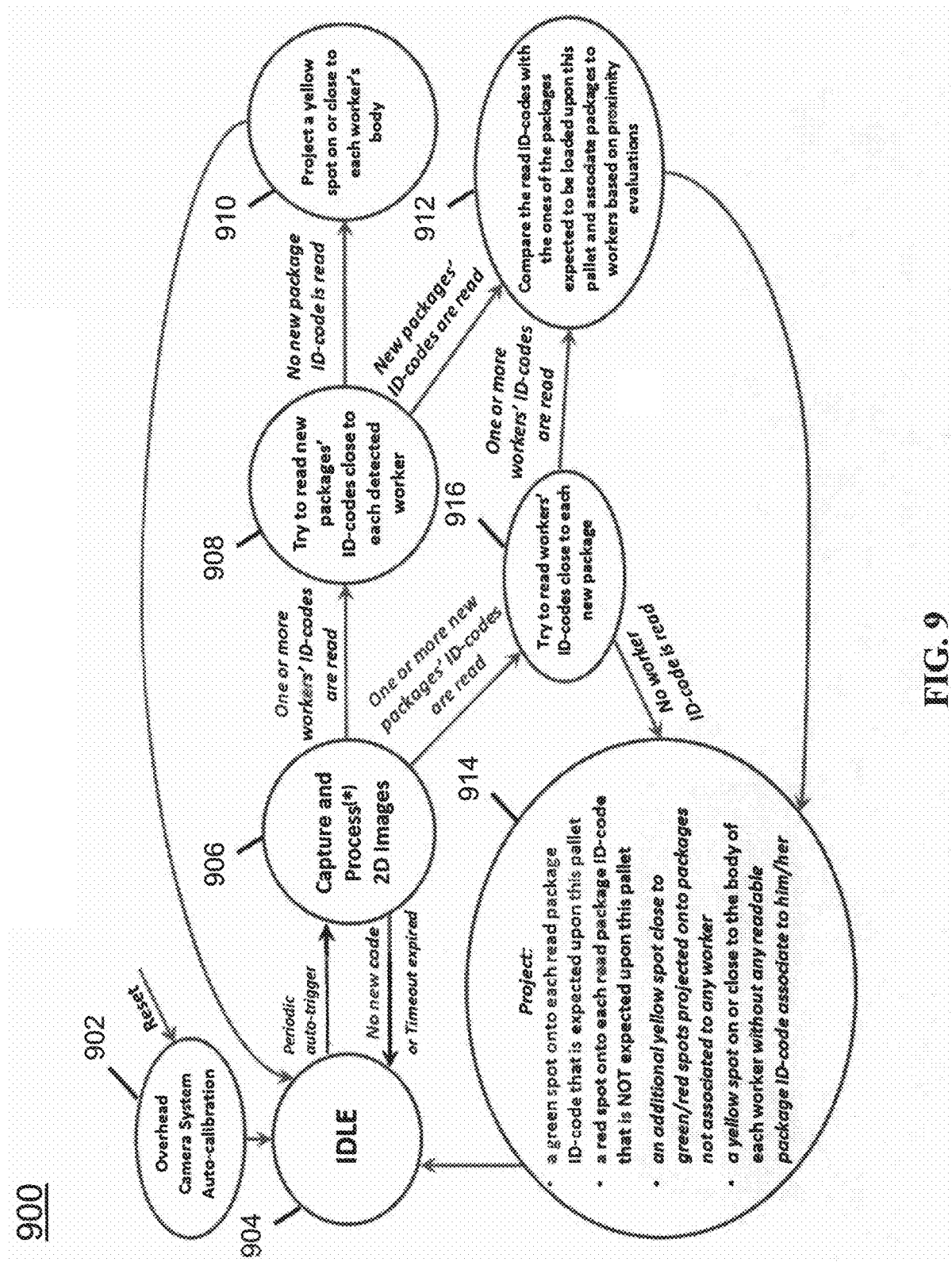
FIG. 9 is an illustrative process for managing a package logistics process with having identifiers of operators and without having a 3D camera.

With regard to FIG. 9, an illustrative process 900 for managing a package logistics process with having identifiers of operators and without having a 3D camera is shown. In this embodiment, 2D image processing is configured to localize and read identifiers of operators and/or of new packages carried to the pallet. Worker identifiers may also be used to detect and signal possible cases of added package without a readable code. The 3D camera is not included in this embodiment. The image processing is time limited, where a preassigned timeout depends on the application specifications.

As with FIG. 8, the diagram is simplified in comparison with an actual process, as main state transitions are shown as if all needed images are captured in a single moment. In reality, however, some feedback to workers may be based on comparison/average of results obtained capturing and processing several consecutive images.

More particularly, at step 902, in response to a turn on or reset, the overhead camera system may be reset and auto-calibrated, in the same or similar manner as in step 802 of FIG. 8. Thereafter, at step 904, the process may be idled and periodic auto-triggering may be performed to capture and process images at step 906. The processing of the 2D localize and read identifiers of operators and packages. At step 908, new identifiers of packages close to each detected worker may be performed. If no new package is read, then at step 910, an inconclusive signal, such as a yellow feedback illumination signal may be projected near the operator. Otherwise, at step 912, a determination may be made to verify whether the package with the identifier is supposed to be at a pallet where delivered and with workers based on proximity. In an embodiment, the algorithms may associate each newly read package to the worker who was supposed to have carried the package. The association may be based on evaluations of proximity between the package and worker positions, and accuracy of that association may be dramatically improved by tracking the operator movements. A feedback signal may be generated at step 914. If at step 906 identifiers of packages are read, then at step 916, identifiers associated with workers close to each new package identified may be read. If no worker identifier is read, then the process may continue at step 914, where a feedback signal may be generated.

Advanced Processing
Package Position Measurement

Each time a code of a package is decoded, the controller knows the coordinates of the code and rotation angle of the code relative to the optical axis and image plane of the camera that decoded the code. Combining the coordinates and rotation angle information with the calibration data, the controller may compute x-y-z coordinates and rotation angles of the code relative to the calibration code, and, thus, relative to the WRS.

If the same code is decoded by more than one camera or more times by at least one camera, the WRS coordinates and rotation angles of the code are more accurate because the WRS coordinates and rotation angles of the code are computed as weighted mean of data received from the different cameras. The weights are higher when the data can be considered more precise, which is when the code is closer to the optical axis and the image plane of the camera.

In response to the controller knowing the code position relative to the WRS, the controller can accurately determine whether the code is inside or outside a given area (e.g., the pallet area). In the use of the system with delivering packages to pallets, knowing whether the code is inside or outside a given area may allow to minimization of the distance between adjacent pallets and, even though the fields of view of two adjacent overhead camera systems are widely overlapped, it is still possible to evaluate if a code is upon the right pallet or upon the wrong pallet. The information further allows knowledge as to whether the code is in a middle area between or amongst the pallets.

With regard to FIG. 11, an illustration of an illustrative environment 1100 of a camera system 1102 with a field-of-view 1104 including one or more cameras capable of capturing 2D images may be positioned over a pallet area 1106 is shown. The overhead camera system 1102 may be configured to compute height (i.e., the z coordinate) of a package code so long as size (i.e., resolution and number of modules of the identifier) is known. In this example, at two different times T1 and T2 in the camera field-of-view 1104, there are two codes, code A and code B, placed at two different heights. Both codes are the same size (e.g. 50×50 mm).

The camera system 1102 sees the centers of both codes exactly in the same image position (same x-y coordinates in pixel domain), but code A appears much bigger than code B due to the different camera magnification at the two heights. Having the two codes being different sizes means different x-y coordinates in pixel domain for the corners of the two codes' bounding boxes. The different size codes may also allow for pre-calibration of the overhead camera system to determinate package height, and, thus, absolute position of packages in 3D space.

Worker Position Measurement

Worker position may be computed almost in the same way as the package position. A difference in the two different position computations is that because workers are to have more than one code on his/her clothing, his/her position may be made to coincide with the centroid of the positions of all of the workers' decoded codes.

Figure 12B:
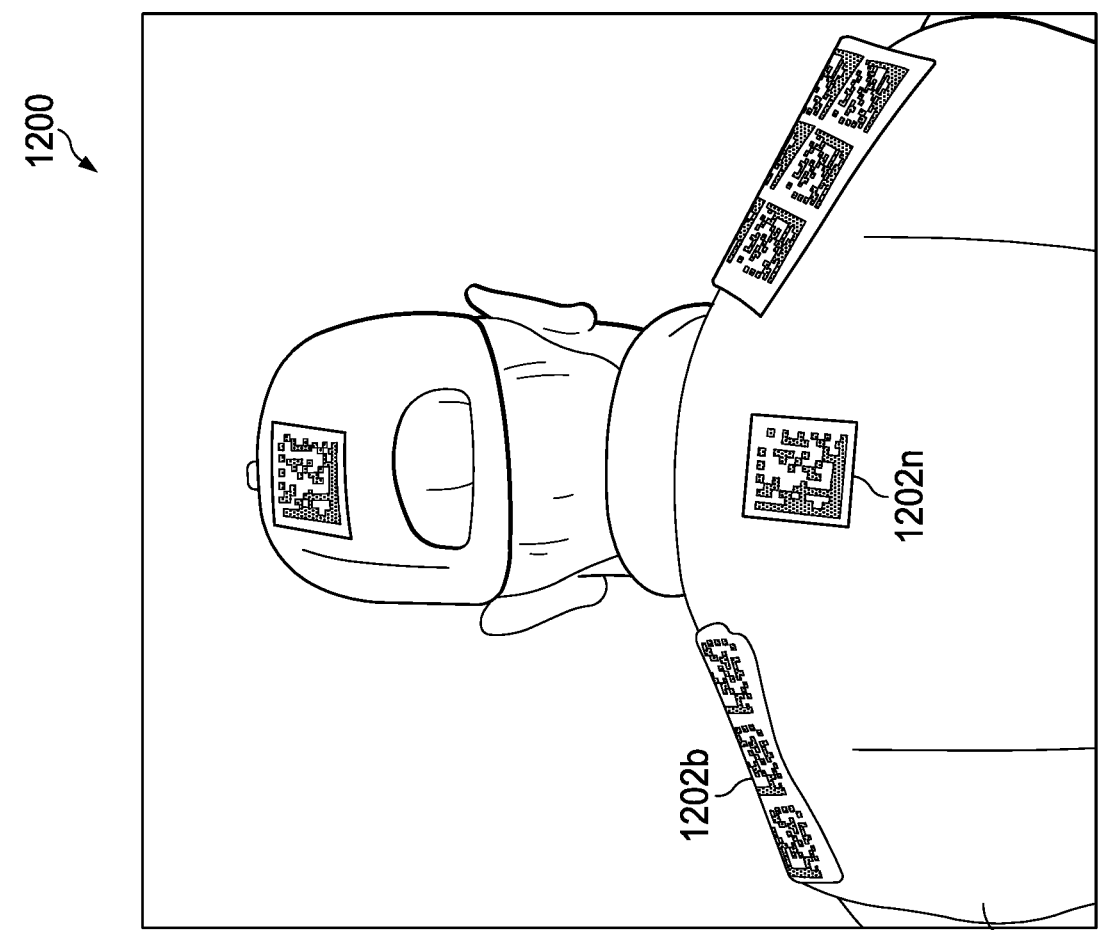
FIGS. 12A and 12B are images of an example of a worker having worker identifiers attached onto his or her hat and high-visibility vest.
Figure 12A:
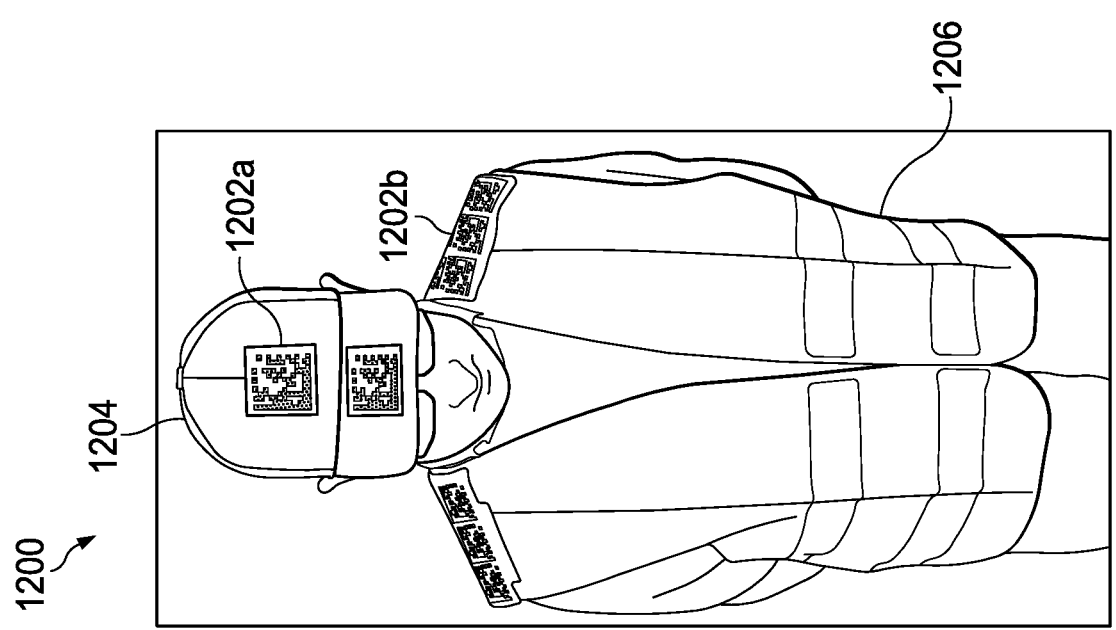

As shown in FIGS. 12A and 12B, an example of a worker 1200 having worker identifiers 1202a-1202n (collectively 1202) attached onto his or her hat 1204 and high-visibility vest 1206. The hat 1204 with codes 1202 can be considered an alternative to the vest 1206 with codes 1204, but in an embodiment, it is mandatory that at least one worker identifier is visible by the overhead camera system, without dependence from: progress of pallet loading, carried-package shape/size, worker height and his/her straight/bent position upon/around the pallet. In an alternative embodiment, machine vision may be used to identify the operator using facial or other recognition.

Strengths of Using Worker Identifier

The use of a worker identifier in comparison with a solution based on 2D/3D sensors/cameras able to detect the addition of new packages without a visible ID-code may include the following:

One of the difficulties of the package tracking application is the detection of an added package whose identifier is not visible/readable by the overhead camera system. There are several possible scenarios where the unreadable identifier problem is very difficult to be solved, also by using 2D/3D sensors/cameras featuring sophisticated machine-vision software tools.

Figure 14:
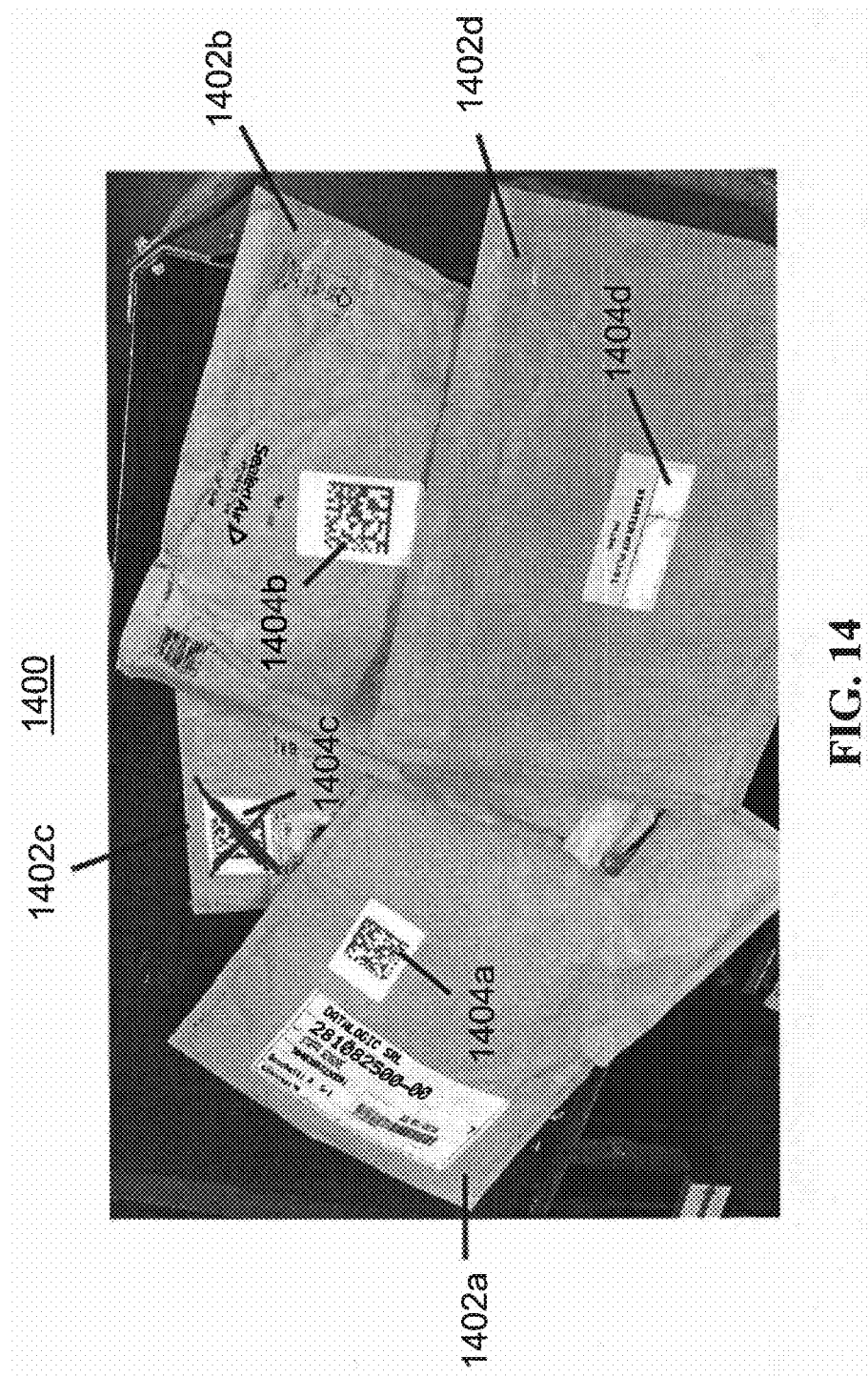
FIG. 14 is an image showing multiple envelopes with two having unreadable or missing ID codes.

Some examples of difficult scenarios may include:

With regard to FIGS. 13A-13C, illustrative scenes 1300a-1300c in which a worker can drop certain kinds of packages (e.g., padded envelops too small to be stacked) into "Chimneys," which are tall empty boxes 1302a-1302c, where many packs may be put inside the chimneys 1302 by workers. As shown in FIG. 13C, (i) workers can place new small packages amongst/under other packages in a niche 1304, wherever the packages fit, (ii) usually workers carry more than one package at once and place the packages all together upon the pallet at the same time. For instance, with regard to FIG. 14, an illustration set of envelopes 1400 of which two envelopes 1402a and 1402b have readable codes 1404a and 1404b, and two of the envelopes 1402c and 1402d have unreadable or missing codes 1404c and 1404d, as shown in FIG. 14.

In practice, an envelope may suddenly dropped into the "chimney" or a small parcel quickly placed in a niche under/amongst other packages such that the package may not be detected by 2D/3D overhead cameras. On the contrary, the identifier of the worker carrying that envelope or that small parcel should be easily readable. As a consequence, the worker identifier allows for providing an inconclusive feedback signal to the worker (e.g., "yellow" real-time illumination feedback signal) even when the added packages are not visible by the overhead camera system. In an embodiment, a presence of the worker may be detected by the 2D/3D overhead camera system also without the usage of the worker identifier by using machine vision SW tools, but the worker identifier may be more easily implemented, thus being a more effective solution, especially whenever more workers are carrying packages upon the same pallet area.

Furthermore worker identifiers allows for:

(a) knowing which worker is carrying each identified package;

(b) providing each worker his/her own feedback;

(c) warning workers anytime an identifier on a package is not-readable; and (d) measuring efficiency of each operator.

The scenario provided by FIG. 14 is very difficult also when worker identifiers are used. To handle this kind of situation, the following may be performed:

(1) project green/red spots (or provide any other feedback signal) onto the two readable codes to let the worker realize that the other two envelopes have not been identified, and, therefore, no spot is projected onto the those two envelopes;

(2) project a feedback signal close to the worker with a number, optionally in green, of right codes, and a number, optionally in red, of wrong codes and let the worker realize that the other two carried envelopes have not been identified;

(3) educate workers to show one-by-one the envelopes' identifiers or identifiers to the overhead camera system, and to wait for the projected feedback before making visible a next envelope identifier. In order to improve the ease of use, the system may provide the worker an initial "yellow" feedback illumination signal that switches to "green"/"red" (for a while) if the first shown envelope is identified, otherwise the illumination feedback signal remains "yellow" until the first readable envelope identifier is shown. In an embodiment, after a "green"/"red" spot is projected, an intermediate "yellow" spot may be projected in order to indicate to the operator when it is possible to show a new identifier, and so on. In an embodiment, an extended duration of the "yellow" spot, after a new envelope has been shown, means that the overhead camera system cannot identify that envelope.

The solution based on worker ID codes or identifiers may be able to track and log all movements of the worker inside the field-of-view of the overhead camera system. In an embodiment, the workers may add information to the log file by showing special control codes to the overhead camera system. For example, a special control code may be used by workers to cancel a registered "yellow" event whenever the "yellow" event was caused not by a new package with a not readable or missing ID code, but by a worker's permanence around or upon a pallet for other reasons (e.g., rearrangement of packages, maintenance, etc.). The worker identifier position and orientation may be also used to foresee where the worker is carrying the package in his hands, which allows for the system to address/accelerate the reading of worker and package identifiers in the images captured subsequently.

Confidence Model

In an embodiment, the system may be able to learn from its failures and adjust future behavior. For example, when the system detects a wrong package, the system has the ability to log images just prior and just after the event. Then, at a later time, a human can review the images and help determine why the wrong package was detected.

A report may be generated to let an operator know why certain events are happening with the system. The operator may make operator training adjustments or make corrections to the software program.

Datalogic WebSentinel Plus software solution for monitoring operational activities of cameras and processor(s) may be a value to add into the solution with the tiers of viewing (see, for example, http://www.datalogic.com/eng/products/transportation-logistics/stationary-industrial-scanners/websentinel-plus-pd-710.html):

1) Local (Access to specific camera and also, optionally, access to the array of cameras)

2) Facility (Access to all cameras/Arrays in a facility)

3) Enterprise (Access to all facilities and arrays)

The system may be configured to demonstrate a "heartbeat" message and statistical information on the system so an operator can monitor camera errors or issues.

Figure 15:
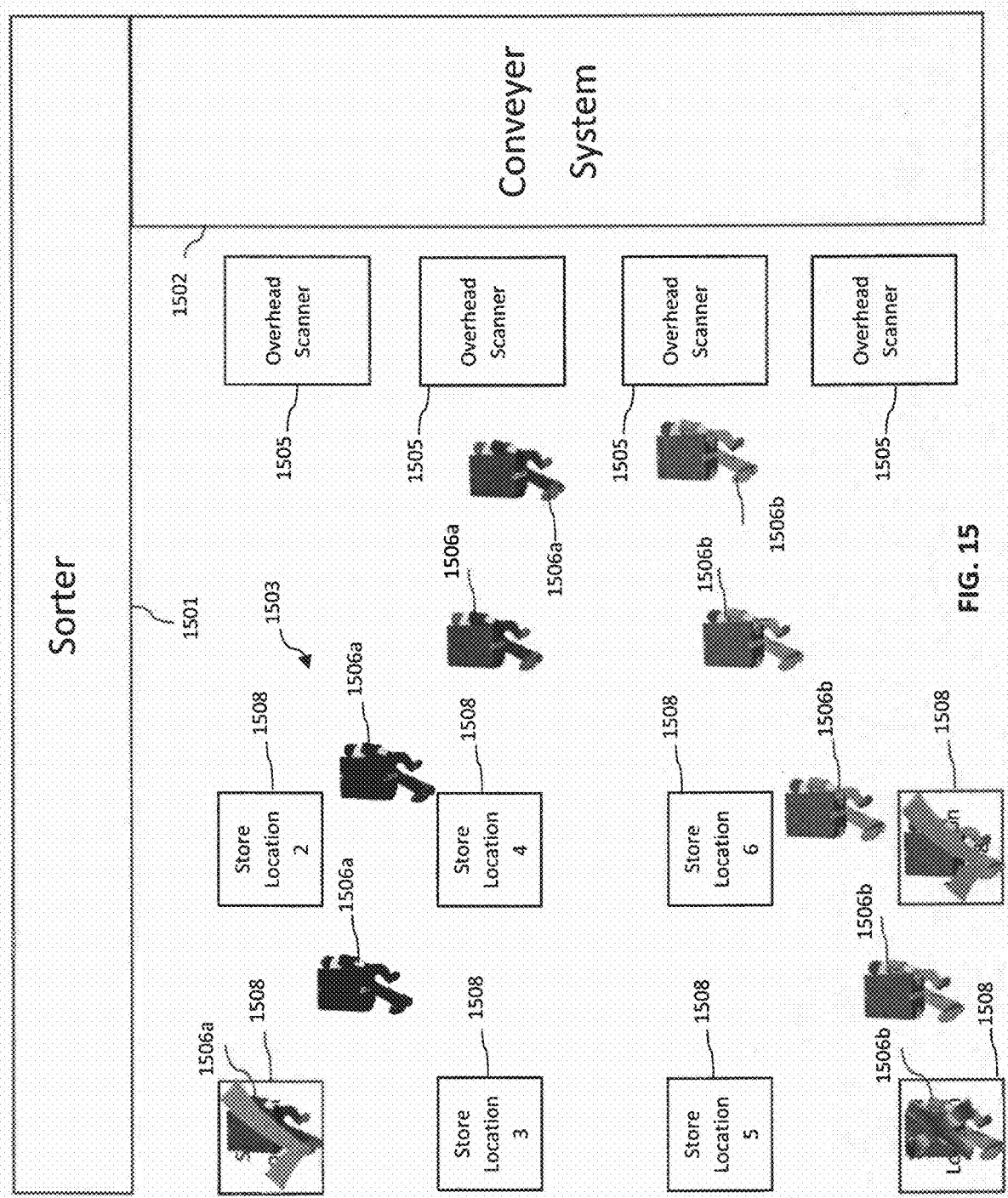
FIG. 15 is a block diagram of a package processing environment according to one or more embodiments of the disclosure.

FIG. 15 is a block diagram of a package processing environment 1500 incorporating one or more embodiments described above. The environment may include a conveyer system 1502 (e.g., a downlane divert conveyer) that moves packages (e.g., boxes, items, parcels, etc.) that may have been previously sorted at a sorting location ("sorter 1501"). Workers or operators may physically move those packages to a pallet area 1503 having one or more pallets 1508 during a fine sorting process of the packages. In certain environments, each pallet 1508 may be designated for stacking and shipment to a common location (e.g., store location).

One or more overhead scanners 1505 may be positioned proximate the conveyor system 1502 to scan machine readable indicia (e.g., optical codes) associated with the packages as the packages are removed from the conveyor system 1502 to identify the packages as well as determine the destination pallet for loading. As discussed above, the packages may be identified based on size, shape, color, markings, being carried by an operator, or otherwise. The system may also be configured to associate the scanned package with the operator carrying the package to the pallet area 1503. Associating the scanned package with the operator may enable feedback being provided to the operator such as providing directions to the operator to guide the operator through the facility and pallet area 1503 to the correct pallet 1508.

As an example, a first operator 1506a may select a package from the conveyor system 1502 at which point one of the overhead scanners 1505 (or a handheld scanner, wearable scanner, etc.) may scan the package to determine the destination pallet 1508 assigned to store location 1. The operator 1506a may load the package onto the pallet 1508 assigned to store location 1, which according to the registry is the correct location. The camera system described above may determine that the package is at its correct destination pallet 1508 for loading, and a positive feedback signal may be provided to the operator, as described above. A second operator 1506b may select a package from the conveyor system 1502 at which point one of the overhead scanners 1505 (or a handheld scanner, wearable scanner, etc.) may scan the package to determine the destination pallet 1508 assigned to store location 8. The operator 1506a may attempt to load the package onto the pallet 1508 assigned to store location 7, which according to the registry is not the correct location. The camera system described above may determine that the package is not at its correct destination pallet 1508 for loading, and a negative feedback signal may be provided to the operator as described above. The second operator 1506b may correct this situation by loading the package onto the pallet 1508 assigned to store location 8, which according to the registry is the correct location. The camera system described above may determine that the package is at its correct destination pallet 1508 for loading, and a positive feedback signal may be provided to the operator as described above. If, on the other hand, the second operator 1506b does not correct this situation (i.e., the system determines the package is placed at an incorrect location), the system may escalate the alert to inform the operator (or other operators) of the mistake to correct the mistake. In some embodiments, the operator may not be permitted to pick up a new package until the situation is corrected. Each transaction (i.e., package delivery) may be verified and logged, as well as user metrics regarding the operator, such as efficiency, accuracy, and fitness (e.g., steps logged, distance traveled, weight carried) may be logged and aggregated during a shift or other period.

In some embodiments, the recommended path within the environment to the correct destination pallet may be provided by the system to the operator. Such feedback may be provided by visual methods (e.g., lights, augmented reality, etc.), audible methods (e.g., instructions on loudspeaker, headset, etc.), or other similar methods. In some embodiments, the destination pallet itself or surrounding area may be highlighted (e.g., illumination) to provide guidance to the operator to easily recognize the delivery location for the package.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the disclosure. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of one or more preferred embodiments for implementing the invention, and the scope of the invention should not necessarily be limited by this description. The scope of the present invention is instead defined by the claims.

What is claimed:

1. A system, comprising:
    at least one two-dimensional (2D) camera disposed above an area in which a pallet is positioned, the at least one 2D camera being configured to capture an image of a package moved by an operator and positioned on the pallet;
    an electronic feedback device configured to generate a first feedback signal and a second feedback signal as human-perceptible signals; and
    a processing unit in communication with the at least one 2D camera and the electronic feedback device, the processing unit including one or more processors configured to:
        determine a package identifier identified on the package as captured by the at least one 2D camera;
        identify the operator based on an operator identifier positioned on the operator;
        associate the operator with the package and track the operator moving with the package;
        determine whether the package is to be positioned on the pallet based on at least one of the package identifier or the operator identifier;
        in response to determining that the package is not to be positioned on the pallet, cause the electronic feedback device to generate the first feedback signal indicative to the operator that the package is not to be placed on the pallet;
        otherwise, in response to determining that the package is to be positioned on the pallet, either cause the electronic feedback device to generate the second feedback signal that is indicative to the operator that the package is to be on the pallet or not generate a second feedback signal.

2. The system according to claim 1, wherein the processing unit is further configured to:
    determine that the package identifier on the package is unable to be read; and
    in response to determining that the package identifier is unable to be read, causing the electronic feedback device to generate a third feedback signal that is indicative to the operator that the package identifier is unable to be read by the at least one 2D camera.

3. The system according to claim 1, further comprising a three-dimensional (3D) camera positioned over the pallet, and configured to measure height of packages placed on the pallet.

4. The system according to claim 3, wherein the processing unit further configured to:
    determine that the height of the packages in a region on the pallet has changed; and
    in response to determining that the height of the packages in a region on the pallet has changed, cause at least one of the 2D cameras to capture an image of the package identifier on the package in the region.

5. The system according to claim 1, wherein the first and second feedback signals are visible feedback signals, and wherein the electronic feedback device includes an illuminator and an actuator configured to steer the illuminator to direct visual feedback signals to be incident on the package.

6. The system according to claim 5, wherein the processing unit is configured to cause the electronic feedback device to generate (i) a first color for the visual feedback signals in response to determining that the package is not to be placed on the pallet and (ii) a second color for the visual feedback signals in response to determining that the package is to be placed on the pallet.

7. The system according to claim 6, wherein the processing unit is configured to cause the electronic feedback device to generate a third color for the visual feedback signals in response to determining that the package identifier on the package is unable to be read.

8. The system according to claim 1, wherein the electronic feedback device is a wearable device.

9. The system according to claim 1, wherein the first feedback signal causes a tactile signal to be produced for the operator to feel.

10. The system according to claim 1, wherein the at least one 2D camera includes at least two 2D cameras having different fields-of-view and depths-of-field.

11. The system according to claim 10, wherein the at least two 2D cameras are positioned at different heights over the pallet.

12. The system according to claim 1, wherein the processing unit is further configured to:
    receive an image of the package being carried by the operator; and
    in response to determining that the operator is along a path moving toward an incorrect pallet with the package, cause the electronic feedback device to generate the first feedback signal indicative to the operator that the package is not to be placed on the pallet prior to the package arriving at the pallet.

13. A method, comprising:
    determining a package identifier identified on a package as captured by at least one 2D camera;
    identifying an operator based on an operator identifier positioned on the operator;

associating the operator with the package and track the operator moving with the package;

determining whether the package is to be positioned on a pallet based on the operator identifier; and in response to determining that the package is not to be positioned on the pallet, generating a first feedback signal indicative to the operator that the package is not to be placed on the pallet;

otherwise, in response to determining that the package is to be positioned on the pallet, either generating a second feedback signal that is indicative to the operator that the package is to be on the pallet or not generating a second feedback signal.

14. The method of claim 13, further comprising:
generating one or more additional alert signals indicative of a package of a particular package type being handled in a problematic manner.

15. The method of claim 14, wherein the one or more additional alert signals are indicative of at least two packages being placed too close to each other on the pallet based on known contents of the two packages.

16. The method of claim 14, wherein the one or more additional alert signals are indicative of packages being placed on the pallet above a predetermined height or above a predetermined threshold for number of packages placed on the pallet.

17. The method according to claim 13, wherein determining whether the package is to be positioned on the pallet is based on the identifier of the operator when the package identifier is not read while the operator is located within the field of view of another camera disposed above an area in which the pallet is positioned.

18. The method according to claim 17, wherein by at least one 2D camera used to determine the package identifier for purposes of associating with the operator is incorporated within a barcode scanner positioned proximate a starting location remote from the pallet.

19. A method, comprising:
determining an operator identifier identified on an operator as captured by at least one 2D camera;

capturing an image of an area close to the operator;

associating a package identified within the captured image with the operator;

attempt reading in the captured image a package identifier identified on the package;

determining whether the package is to be positioned on a pallet based on the package identifier in response to successfully reading the package identifier or successfully reading the operator identifier when the package identifier is not successfully read;

in response to determining that the package identifier is unable to be read, generating the feedback signal to be indicative to the operator that the package identifier is unable to be read; and in response to determining that the package is not to be positioned on the pallet, generating a first feedback signal indicative to the operator that the package is not to be placed on the pallet;

otherwise, in response to determining that the package is to be positioned on the pallet, either generating a second feedback signal that is indicative to the operator that the package is to be on the pallet or not generating a second feedback signal.

20. The method of claim 19, wherein the first and second feedback signals are visual feedback signals illuminated close to the operator, on the package, or on an area occupied by the pallet.

* * * * *